United States Patent
Dessalegn et al.

(10) Patent No.: US 10,934,001 B2
(45) Date of Patent: Mar. 2, 2021

(54) METHODS OF ASSIGNING SEATS TO UTILIZE TRANSFORMABLE SEAT ASSEMBLIES

(71) Applicant: THE BOEING COMPANY, Chicago, IL (US)

(72) Inventors: Haftom Y. Dessalegn, Mountlake Terrace, WA (US); John G. Schultz, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 167 days.

(21) Appl. No.: 16/223,955

(22) Filed: Dec. 18, 2018

(65) Prior Publication Data

US 2020/0189742 A1    Jun. 18, 2020

(51) Int. Cl.
| | | |
|---|---|---|
| *B64D 11/06* | (2006.01) | |
| *G06Q 10/02* | (2012.01) | |
| *G06Q 50/30* | (2012.01) | |

(52) U.S. Cl.
CPC ........ *B64D 11/064* (2014.12); *B64D 11/0643* (2014.12); *G06Q 10/02* (2013.01); *G06Q 50/30* (2013.01); *B64D 11/06395* (2014.12)

(58) Field of Classification Search
USPC .......................................................... 701/49
See application file for complete search history.

(56) References Cited

U.S. PATENT DOCUMENTS

| | | |
|---|---|---|
| 1,548,334 A | 8/1925 | Sebell |
| 3,563,346 A | 2/1971 | Bainbridge |
| 3,761,124 A | 9/1973 | Weik et al. |
| 5,133,245 A | 7/1992 | Lee et al. |
| 5,299,853 A | 4/1994 | Griswold et al. |
| 5,393,123 A | 2/1995 | Hernandez et al. |

(Continued)

FOREIGN PATENT DOCUMENTS

| | | |
|---|---|---|
| DE | 3537203 A1 | 4/1986 |
| DE | 3842733 A1 | 6/1990 |

(Continued)

OTHER PUBLICATIONS

Extended European Search Report for EP Application No. 19206518.3 dated May 7, 2020.

*Primary Examiner* — Tyler D Paige
(74) *Attorney, Agent, or Firm* — Marshall, Gerstein & Borun LLP

(57) ABSTRACT

Systems, methods, and computer-readable media storing instructions for utilizing space associated with unoccupied seats in organized seating arrangements are disclosed herein. The disclosed techniques identify unoccupied seats within an organized seating arrangement, such as seats on an aircraft. Upgradable seats within the organized seating arrangement are determined based upon the unoccupied seats and the transformation capabilities of the seats. Upgradable seats are directly in front of or behind unoccupied seats, such that either the upgradable seat or the associated unoccupied seat is transformable to enable an upgrade. An occupant of a seat is selected for an upgrade associated with an upgradable seat and assigned the upgrade to enable the occupant to utilize a portion of the space associated with the unoccupied seat while sitting in the upgradable seat.

20 Claims, 25 Drawing Sheets

(56) References Cited

U.S. PATENT DOCUMENTS

| | | |
|---|---|---|
| 5,611,503 A | 3/1997 | Brauer |
| 5,690,384 A | 11/1997 | Rossi |
| 5,740,989 A | 4/1998 | Daines |
| 5,758,924 A | 6/1998 | Vishey |
| 5,779,312 A | 7/1998 | Nagai et al. |
| 5,871,259 A | 2/1999 | Gehart |
| 6,079,773 A | 6/2000 | Hassan |
| 6,082,815 A | 7/2000 | Xiromeritis et al. |
| 6,322,146 B1 | 11/2001 | Fisher, Jr. |
| 6,869,121 B2 | 3/2005 | Kayumi et al. |
| 6,877,807 B2 | 4/2005 | Mizuno et al. |
| 8,888,189 B2 | 11/2014 | Tamura et al. |
| 8,936,214 B2 | 1/2015 | Foucher et al. |
| 9,650,145 B2 | 5/2017 | Lambert |
| 10,336,262 B2 | 7/2019 | Mozurkewich et al. |
| 2002/0043857 A1 | 4/2002 | Glance |
| 2003/0057910 A1 | 3/2003 | Nivet |
| 2004/0051003 A1* | 3/2004 | Cheung ............ B64D 11/0643 244/118.6 |
| 2005/0088021 A1 | 4/2005 | Knaust et al. |
| 2006/0100914 A1* | 5/2006 | Jafri ................ G06Q 10/02 705/5 |
| 2008/0033771 A1* | 2/2008 | Barry ............... G06Q 10/02 705/5 |
| 2008/0315637 A1 | 12/2008 | Ghisoni et al. |
| 2009/0243358 A1 | 10/2009 | Henshaw |
| 2009/0271227 A1* | 10/2009 | Hayat .............. G06Q 30/0601 705/6 |
| 2010/0194133 A1 | 8/2010 | Nakamura et al. |
| 2011/0241402 A1 | 10/2011 | Bruck et al. |
| 2013/0054279 A1* | 2/2013 | Sharp ................ G06Q 10/02 705/5 |
| 2014/0062157 A1 | 3/2014 | Bruck |
| 2014/0132040 A1 | 5/2014 | Arakawa et al. |
| 2015/0199618 A1* | 7/2015 | Khan ................ H04W 4/80 705/5 |
| 2015/0242888 A1* | 8/2015 | Zises ............... G06Q 30/0252 705/14.5 |
| 2016/0023574 A1 | 1/2016 | Cheng |
| 2016/0227931 A1 | 8/2016 | Ledat |
| 2020/0139861 A1 | 5/2020 | Nevarez et al. |
| 2020/0189742 A1* | 6/2020 | Dessalegn ........... G06Q 10/02 |

FOREIGN PATENT DOCUMENTS

| | | |
|---|---|---|
| DE | 19952339 A1 | 5/2000 |
| DE | 10112017 A1 | 9/2002 |
| DE | 10143807 A1 | 3/2003 |
| EP | 2103479 A2 | 9/2009 |
| GB | 956606 A | 4/1964 |
| GB | 1301859 A | 1/1973 |
| JP | 11009374 A | 1/1999 |
| WO | WO-2019089075 A1 | 5/2019 |

\* cited by examiner

METHODS OF ASSIGNING SEATS TO UTILIZE TRANSFORMABLE SEAT ASSEMBLIES

FIELD

This disclosure relates to systems and methods for optimizing utilization of available seating in aircraft or other organized seating arrangements by using transformable seat assemblies to reclaim available space from unoccupied seats.

BACKGROUND

Seat occupant comfort is a priority in areas which provide organized seating arrangements. Organized seating, for example provides a seat wherein another seat is positioned in front of the seat and yet another seat is positioned behind the seat. Such organized seating arrangements can be found in, for example, transportation vehicles such as trains, buses or airplanes, as well as, for example, in auditoriums and theaters. As the organized seating becomes occupied, non-occupied adjacent seats can result in being positioned in front of and/or behind a seat which is occupied. It would be beneficial to provide an occupant of a seat, which has an adjacent non-occupied seat, positioned in front of and/or behind the occupied seat, the ability to optimize use of potential usable space provided by the non-occupied adjacent seat so as to provide additional comfort opportunities for the occupant.

Existing methods and systems for managing seating occupancy in organized seating arrangements are inadequate for optimizing utilization of space associated with unoccupied seats by those sitting in front of or behind such unoccupied seats. Instead, existing methods and systems for managing seating merely record whether seats are occupied or unoccupied, which data is used for ticket sales or seat assignment. Thus, it would be beneficial to provide systems and methods of managing seating occupancy that optimizing utilization of unoccupied seats.

SUMMARY

An example includes a computer-implemented method implemented by one or more processors, comprising: receiving seating data regarding a plurality of seat assemblies arranged in an organized seating arrangement, wherein the plurality of seat assemblies comprises one or more transformable seat assemblies; identifying one or more unoccupied seat assemblies of the plurality of seat assemblies based upon the seating data; determining one or more upgradable seat assemblies of the plurality of seat assemblies; selecting an occupant assigned to a seat assembly of the plurality of seat assemblies for an upgrade, wherein the upgrade is associated with one of the one or more unoccupied seat assemblies and is further associated with one of the one or more upgradable seat assemblies; and assigning the upgrade to the occupant.

Another example includes a computer system, comprising one or more processors and a program memory communicatively connected to the one or more processors and storing executable instructions that, when executed by the one or more processors, cause the computer system to: receive seating data regarding a plurality of seat assemblies arranged in an organized seating arrangement, wherein the plurality of seat assemblies comprises one or more transformable seat assemblies; identify one or more unoccupied seat assemblies of the plurality of seat assemblies based upon the seating data; determine one or more upgradable seat assemblies of the plurality of seat assemblies; select an occupant assigned to a seat assembly of the plurality of seat assemblies for an upgrade, wherein the upgrade is associated with one of the one or more unoccupied seat assemblies and is further associated with one of the one or more upgradable seat assemblies; and assign the upgrade to the occupant.

Yet another example includes a tangible, non-transitory computer-readable medium storing executable instructions, which executable instructions, when executed by one or more processors of a computer system, cause the computer system to: receive seating data regarding a plurality of seat assemblies arranged in an organized seating arrangement, wherein the plurality of seat assemblies comprises one or more transformable seat assemblies; identify one or more unoccupied seat assemblies of the plurality of seat assemblies based upon the seating data; determine one or more upgradable seat assemblies of the plurality of seat assemblies; select an occupant assigned to a seat assembly of the plurality of seat assemblies for an upgrade, wherein the upgrade is associated with one of the one or more unoccupied seat assemblies and is further associated with one of the one or more upgradable seat assemblies; and assign the upgrade to the occupant.

In such examples, the seating data comprises (i) arrangement data indicating positions of the seat assemblies in the organized seating arrangement and (ii) occupancy data indicating whether each seat assembly of the plurality of seat assemblies is occupied or unoccupied. Each of the one or more upgradable seat assemblies is one or both of the following: (i) located directly behind one of the seat assemblies that is both one of the unoccupied seat assemblies and one of the transformable seat assemblies, or (ii) one of the transformable seat assemblies that is located directly in front of one of the unoccupied seat assemblies. The upgrade enables the occupant to use a portion of space associated with the one of the one or more unoccupied seat assemblies associated with the upgrade while occupying the one of the one or more upgradable seat assemblies associated with the upgrade.

The features, functions, and advantages that have been discussed can be achieved independently in various embodiments or may be combined in yet other embodiments, further details of which can be seen with reference to the following description and drawings.

DESCRIPTION

Disclosed herein are systems, methods, and non-transitory computer-readable media storing instructions for utilizing space associated with unoccupied seats in organized seating arrangements. Such organized seating arrangements may include seats in an aircraft or other mode of transportation, seats in an entertainment venue such as a theater, or seats in other venues having arrangements of seats in which the seats cannot practicably be removed when unoccupied (e.g., seat assemblies bolted to a particular location). In order to optimize the use of space associated with such unoccupied seats that cannot be removed, the techniques disclosed herein identify and allocate upgrades involving unoccupied seats and using transformable seat assemblies. To facilitate an understanding of the disclosed techniques for utilizing space associated with unoccupied seats, examples of transformable seat assemblies are described herein. While such exemplary types of transformable seat assemblies (separately or in combination) are contemplated for use according to the techniques described below, the disclosed techniques are not limited to such exemplary embodiments.

Figure 1:
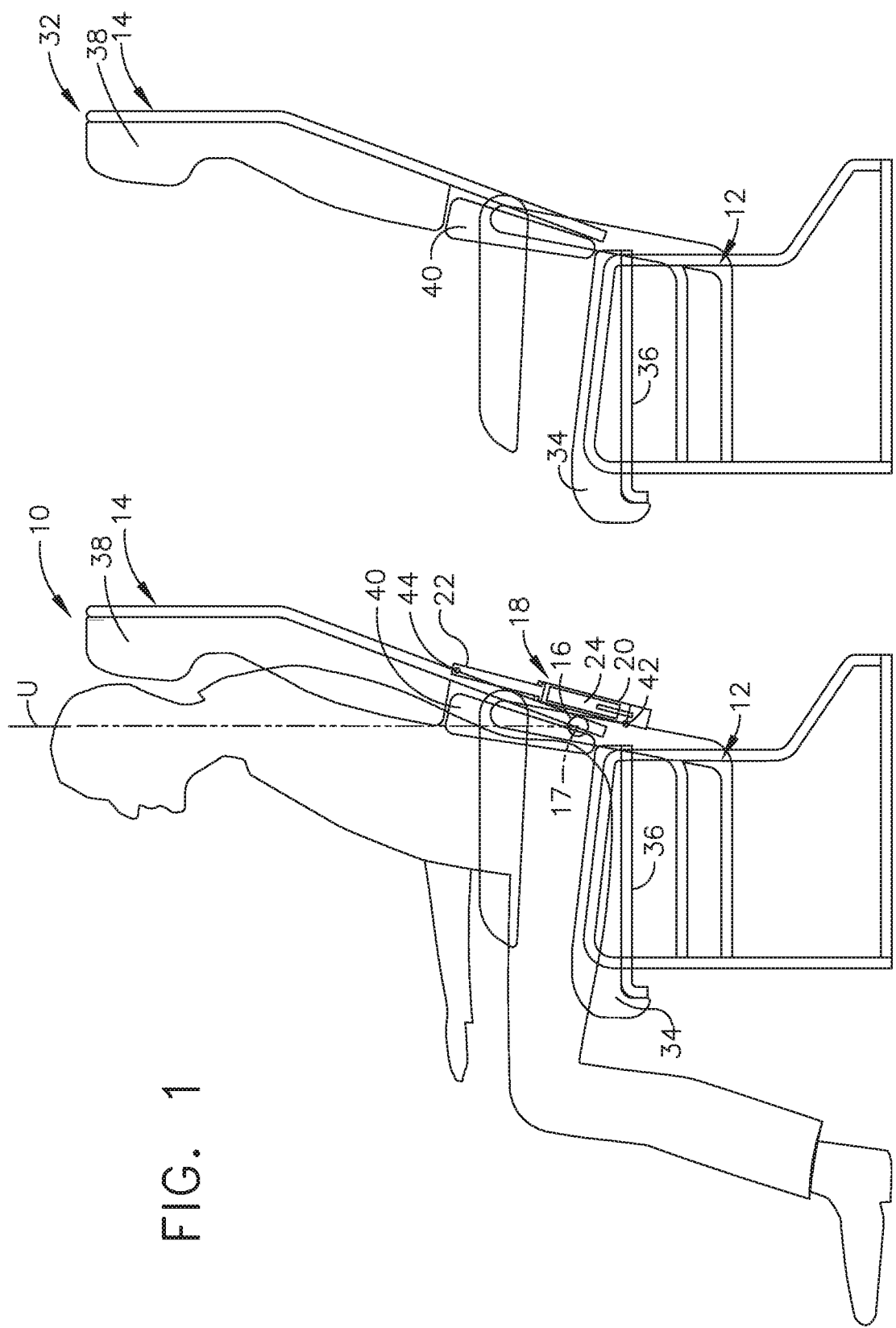
FIG. 1 is a side elevation schematic view of a first example of a transformable seat assembly which is occupied and positioned in an upright position with an unoccupied seat assembly positioned adjacent to and behind the occupied transformable seat assembly.
Figure 2:
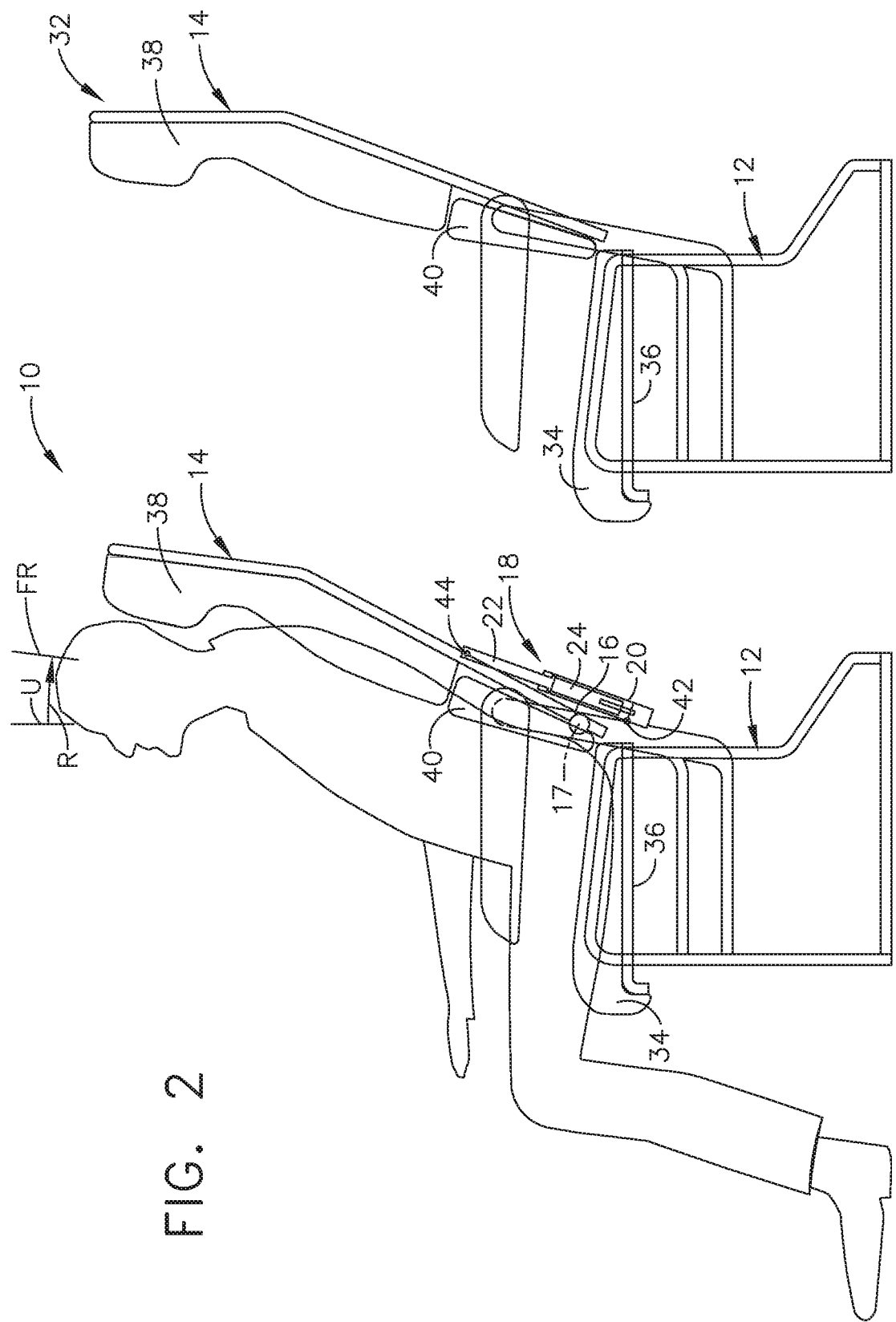
FIG. 2 is the view of the transformable seat assembly of FIG. 1 with the first example of the occupied transformable seat assembly in a first reclined position.
Figure 3:
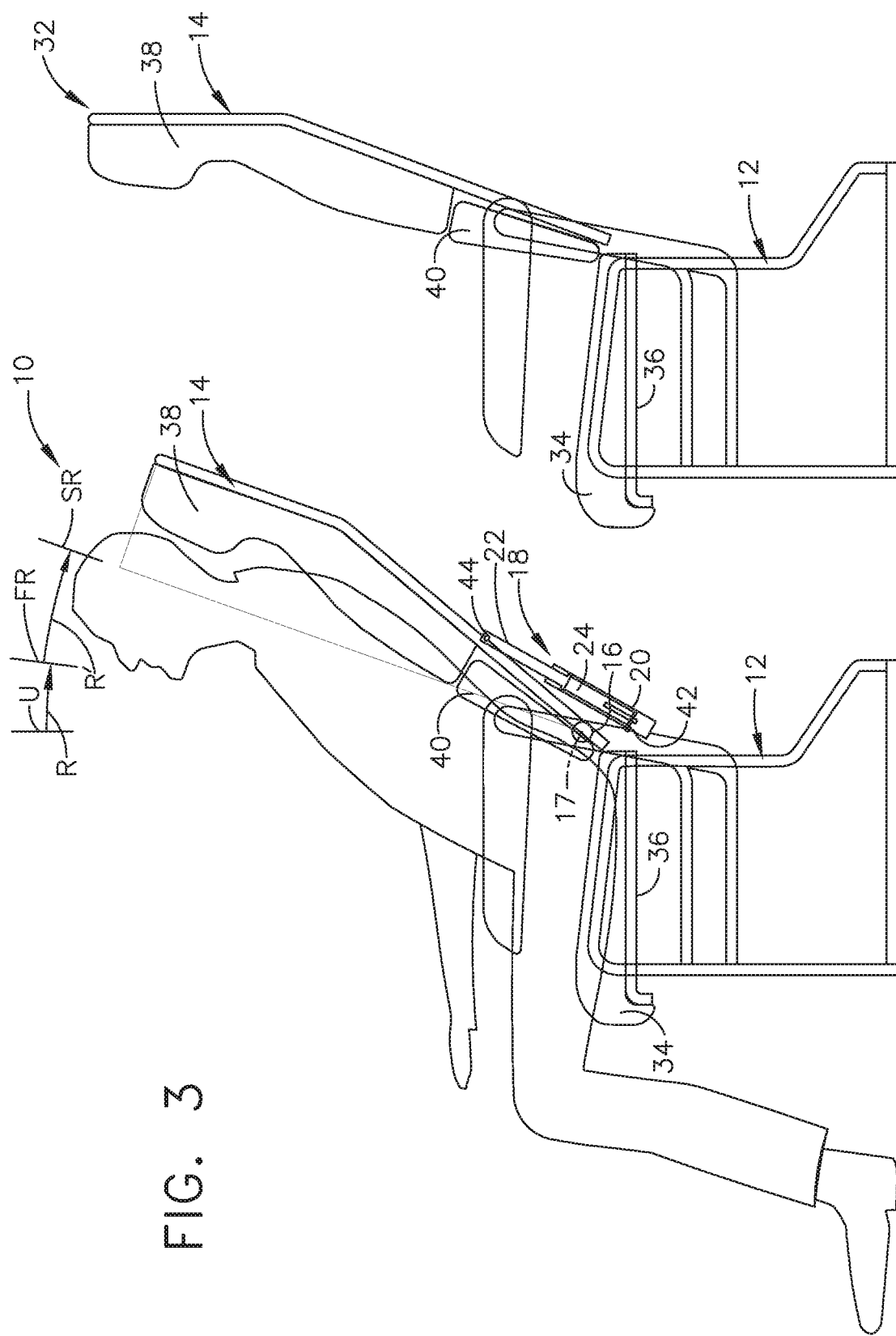
FIG. 3 is the view of the transformable seat assembly of FIG. 1 with the first example of the occupied transformable seat assembly in a second reclined position beyond the first reclined position of FIG. 2.
Figure 4:
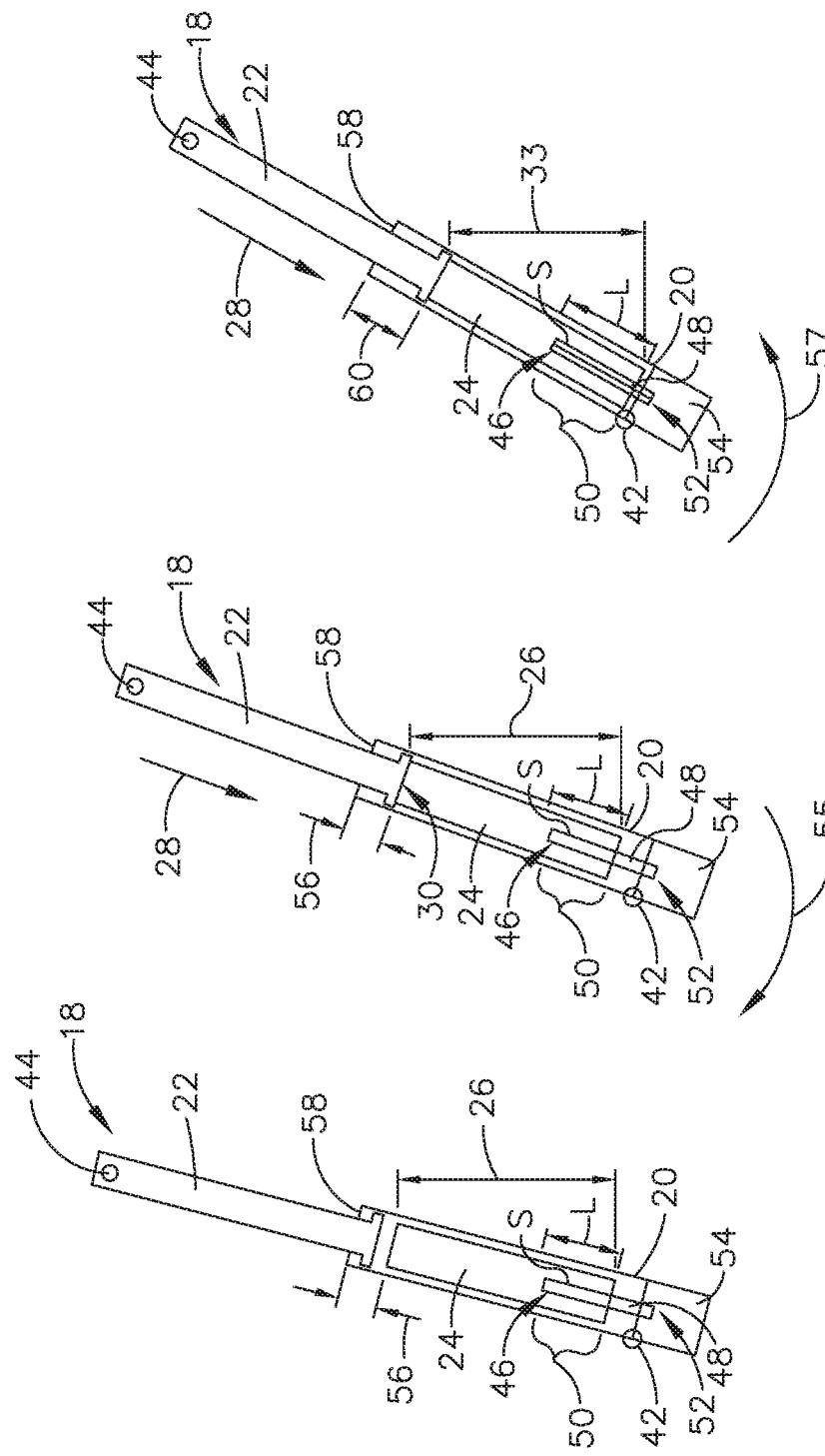
FIG. 4A is an enlarged view of the actuator assembly of FIG. 1.
FIG. 4B is an enlarged view of the actuator assembly of FIG. 2.
FIG. 4C is an enlarged view of the actuator assembly of FIG. 3.

In referring to FIGS. 1-3, first example of transformable seat assembly 10 includes seat support structure 12 and back support structure 14. Back support structure 14 is connected to seat support structure 12 with hinge 16, which defines an axis of rotation 17. Seat support structure 12 can be constructed of one or more parts which provide support for an occupant of transformable seat assembly 10. Similarly, back support structure 14 can be constructed of one or more parts which provide back support to an occupant of transformable seat assembly 10. Actuator assembly 18 includes cylinder 20 and piston 22 with piston 22 positioned within cylinder 20, as seen schematically in FIGS. 4A-4C, which correspond to actuator assembly 18 as positioned with respect to transformable seat 10 as seen in FIGS. 1-3, respectively. Cylinder 20 is secured to one of back support structure 14 or seat support structure 12. In this example cylinder 20 is secured to seat support structure 12. Piston 22 is secured to the other of the one of back support structure 14 or seat support structure 12. In this example, piston 22 is secured to back support structure 14. Back support structure 14 is shown schematically in FIG. 1 in an upright position U.

Blocking member 24 is positioned within and adjustable along cylinder 20. Blocking member 24, as seen in FIGS. 1 and 2 and as shown in FIGS. 4A and 4B respectively, is shown in first position 26, wherein first position 26 is the same position for transformable seat assembly 10 in FIGS. 4A and 4B. In FIG. 1, in this example, back support structure 14 is positioned in upright position U. This upright position U corresponds in this example with piston 22, as seen in FIG. 4A, positioned at end 58 of cylinder 20. Back support structure 14, for example, is locked in position with traditional locking and unlocking engagements for a seat assembly, which can be found, for example, in use such as within an aircraft passenger seat. The occupant can sit down on transformable seat assembly 10 and the occupant can choose to recline back support structure 14 or not to do so. The occupant at that time can push an actuator button, not shown, which can unlock a locking securement of back support structure 14 and allow occupant to rotate back support structure 14 in direction R as shown in FIG. 2 to first reclined position FR, which can be limited, in some examples, to several inches so as not to overly intrude into space occupied by any occupant of second seat assembly 32 positioned behind and adjacent to transformable seat assembly 10. First reclined position FR for back support structure 14 is attained, as seen in FIGS. 2 and 4B, with piston 22 traveling within cylinder 20 in first direction 28 to first limit position 30 of piston 22 with piston 22 coming into abutting relationship with blocking member 24. In piston 22 traveling in first direction 28 to abut blocking member 24, rotational travel of back support structure 14 about axis of rotation 17 is permitted in direction R and back support structure 14 is limited from rotating beyond first reclined position FR with piston 22 coming into abutting relationship with blocking member 24.

In some examples, a displacement of back support structure 14 may be only a few inches, as mentioned above, dependent on the proximity of second seat assembly 32 positioned, in this example, behind and adjacent to transformable seat assembly 10. However, should second seat assembly 32 be unoccupied, the rotational displacement of back support structure 14 can be permitted to allow an occupant of transformable seat assembly 10 to occupy additional space associated with second seat assembly 32. This can allow the occupant of transformable seat assembly 10 the opportunity to optimize their comfort with respect to transformable seat assembly 10. As seen in FIG. 3, with second seat assembly 32 unoccupied and with blocking member 24 in second position 33, as seen in FIG. 4C, wherein blocking member 24 is now positioned further down or recessed within cylinder 20, blocking member 24 permits linear travel of piston 22 in first direction 28 beyond first limit position 30 of piston 22, of FIG. 4B, such that rotational travel in direction R' of back support structure 14, as seen in FIG. 3, can take place rotating back support structure 14, about axis of rotation 17, beyond first reclined position FR to second reclined position SR. Second reclined position SR is greater in rotational displacement from upright position U than first reclined position FR and provides occupant an opportunity to use unoccupied space associated with second seat assembly 32.

In this example, transformable seat assembly 10 further includes seat cushion 34 positioned overlying seat support frame 36 of seat support structure 12 as seen in FIGS. 1-3. Transformable seat assembly 10 further includes back cushion 38 and lumbar cushion 40 each positioned overlying back support structure 14. The configuration of transformable seat assembly 10 with respect to the cushions and seat and back support structures are known components to transformable seat assembly 10, wherein seat support structure 12 is a frame assembly, as mentioned earlier being constructed of one or more parts, which provides support to the occupant with the occupant sitting on seat cushion 34 and back support structure 14 is a support structure, as mentioned earlier being constructed of one or more parts, which provides support to the occupant's back while occupant is sitting in transformable seat assembly 10. In this example, back support structure 14 provides support for back cushion 38 and lumbar cushion 40 providing additional comfort for occupant's back while occupant resides in transformable seat assembly 10.

Cylinder 20 of actuator assembly 18 is pivotally secured with pivot connector 42 to one of back support structure 14 or seat support structure 12 and in this example, as shown in FIG. 1, pivot connector 42 connects cylinder 20 to seat support structure 12. Piston 22 is pivotally secured with pivot connector 44 to one of back support structure 14 or seat support structure 12 and in this example, as shown in FIG. 1, pivot connector 44 connects piston 22 to back support structure 14. Pivot connector 42 provides for cylinder 20 to rotate relative to seat support structure 12 with back support structure 14 rotating about axis of rotation 17 and similarly pivot connector 44 provides for piston 22 to rotate relative to back support structure 14 with back support structure 14 rotating about axis of rotation 17.

In referring to FIGS. 4A-4C, blocking member 24 positioned within cylinder 20 further includes opening 46 defined by blocking member 24 which extends within and along length L of blocking member 24. A plurality of threads (not shown) defined by blocking member 24 are positioned along surface S of opening 46 within blocking member 24. Threaded shaft 48 is associated with opening 46 defined by blocking member 24, wherein threaded shaft 48 defines a plurality of threads (not shown) compatible with the plurality of threads (not shown) defined by blocking member 24.

The plurality of threads (not shown) of a first end portion 50 of threaded shaft 48 engage the plurality of threads (not shown) defined by blocking member 24. Second end portion 52 of threaded shaft 48 is connected to motor 54 which imparts rotation to threaded shaft 48 which results in linear movement of blocking member 24 along cylinder 20. With rotation of threaded shaft 48 by motor 54 in first rotational direction 55, for example as seen in FIG. 4B, blocking member 24 moves from first position 26 toward second position 33, as seen in FIG. 4C. With rotation of threaded shaft 48 by motor 54 in second rotational direction 57, for example as seen in FIG. 4C, blocking member 24 moves from second position 33 toward first position 26, as seen in FIGS. 4A and B.

As seen for example in FIGS. 1 and 2 and in FIGS. 4A and 4B respectively, blocking member 24 is in first position 26. With blocking member 24 in first position 26, back support structure 14 of transformable seat assembly 10 is permitted to rotate about axis of rotation 17 between upright position U and first reclined position FR. With blocking member 24 moved to second position 33, as seen in FIG. 4C, wherein blocking member 24 is positioned in a lower position, in this example, within cylinder 20 than blocking member 24 was in first position 26, as seen in FIGS. 4A and 4B, back support structure 14 of transformable seat assembly 10 is permitted to operate between upright position U and second reclined position SR. Second reclined position SR is a position for the occupant to be closer to a prone position than first reclined position FR. Occupant having an opportunity to attain second reclined position SR provides the occupant an opportunity to optimize use of usable space provided by unoccupied second seat assembly 32 and at the same time optimize the occupant's comfort.

In referring to FIGS. 4A and 4B, first position 26 of blocking member 24 being first distance 56 from end 58 of cylinder 20 such that with piston positioned at end 58 of cylinder 20, as mentioned earlier, back support structure 14 is in upright position U. With blocking member 24 in second position 33 as seen in FIG. 4C, blocking member 24 is second distance 60 from end 58 of cylinder 20. Second distance 60 from end 58 is greater in this example than first distance 56. Blocking member 24 being positioned further from end 58 permits piston 22 to travel further within cylinder 20 resulting in back support structure 14 attaining second reclined position SR providing the occupant of transformable seat assembly 10 an opportunity to recline further and attain more comfort.

Figure 5:
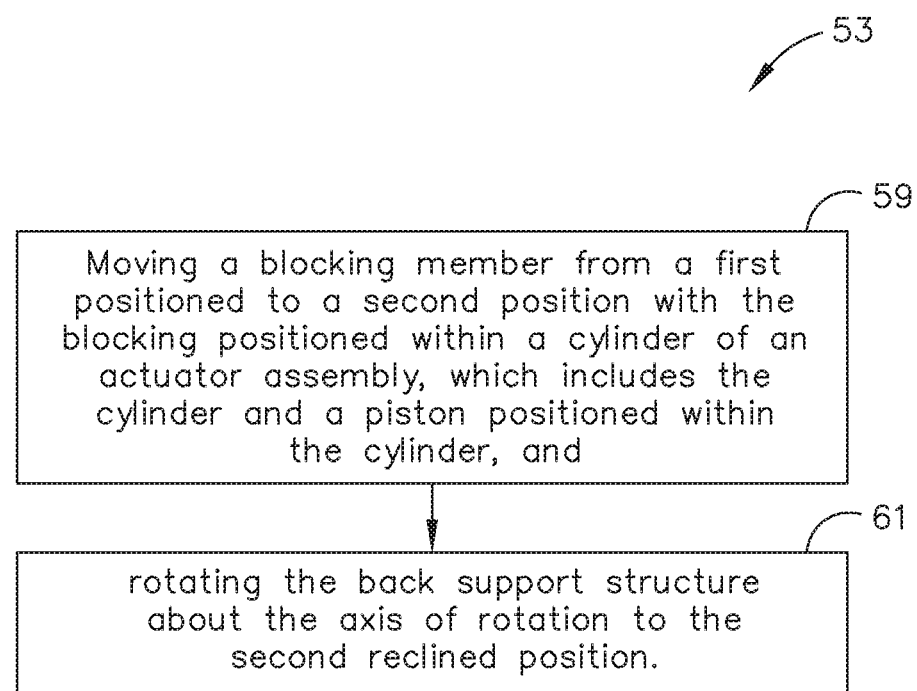
FIG. 5 is a flow chart of a method for transforming the first example of the transformable seat assembly of FIG. 1.

In referring to FIG. 5, method 53 of transforming a transformable seat assembly 10 includes step 59 of moving blocking member 24 from a first position to a second position with the blocking member 24 positioned within cylinder 20 of actuator assembly 18, which includes cylinder 20 and piston 22 positioned within cylinder 20. As seen in FIGS. 1-4C, transformable seat assembly 10 includes seat support structure 12 connected to back support structure 14 with hinge 16, which defines an axis of rotation 17. Cylinder 20 is secured to one of back support structure 14 or seat support structure 12 and piston 22 is secured to the other of the one of back support structure 14 or the seat support structure 12. With blocking member 24 in first position 26, blocking member 24 limits linear travel of piston 22 in first direction 28 to first limit position 30 of piston 22 such that rotational travel of the back support structure 14 about axis of rotation 17 is limited from rotating back support structure 14 beyond first reclined position FR. With blocking member 24 in second position 33, blocking member 24 permits linear travel of piston 22 in first direction 28 beyond first limit position 30 of piston 22 such that rotational travel of back support structure 14 about axis of rotation 17 is permitted beyond first reclined position FR to second reclined position SR. Method 53 further includes step 61 of rotating back support structure 14 about axis of rotation 17 to the second reclined position SR.

As mentioned earlier, transformable seat assembly 10 further includes seat cushion 34 positioned in overlying relationship to seat support structure 12 and includes back cushion 38 and lumbar cushion 40 positioned in overlying relationship to back support structure 14. In addition, cylinder 20 is pivotally secured to one of back support structure 14 or seat support structure 12 and piston 22 is pivotally secured to the other of the one of the back support structure 14 or the seat support structure 12. With rotating back support structure 14 about axis of rotation 17 the pivotal securement permits cylinder 20 to pivotally rotate relative to the one of the back support structure 14 or the seat support structure 12 and permits piston 22 to pivotally rotate relative to the other of the one of the back support structure 14 or the seat support structure 12.

Step 59 of moving the blocking member 24 positioned within the cylinder 20 further includes activating motor 54 to rotate threaded shaft 48, as seen in FIGS. 4A-4C. Blocking member 24 defines opening 46, which extends within and along length L of blocking member 24. Plurality of threads (not shown) defined by blocking member 24 are positioned along surface S of opening 46 within blocking member 24. Threaded shaft 48, associated with the opening 46 defined by blocking member 24, defines plurality of threads (not shown) compatible with the plurality of threads (not shown) defined by blocking member 24. Plurality of threads (not shown) of first end portion 50 of threaded shaft 48 engages the plurality of threads (not shown) defined by blocking member 24 and second end portion 52 of threaded shaft 48 is connected to motor 54. Rotation of threaded shaft 48 imparts linear movement of blocking member 24 along cylinder 20. With rotating threaded shaft 48 in a first rotational direction 55, for example as seen in FIG. 4B, blocking member 24 moves from first position 26 to second position 33, as seen in FIG. 4C. With blocking member 24 in second position 33, as seen in FIG. 4C, and with rotating threaded shaft in second rotational direction 57, for example as seen in FIG. 4C, results in moving blocking member 24 from second position 33 to first position 26 of either FIG. 4A or 4B.

Figure 6:
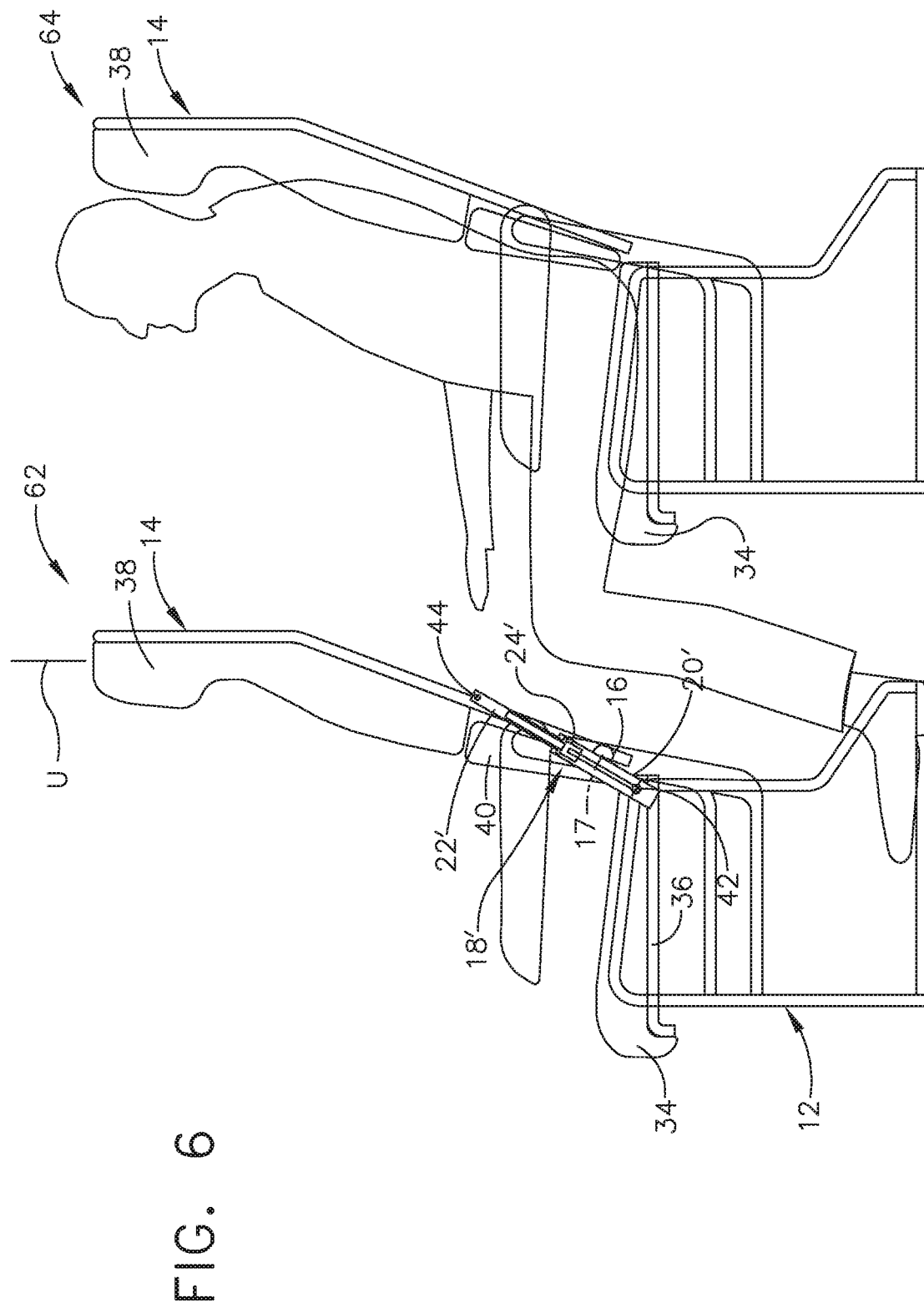
FIG. 6 is a side elevation schematic view of a second example of a transformable seat assembly which is unoccupied and is positioned in an upright position with an occupied seat assembly positioned behind and adjacent to the second example of the transformable seat assembly.
Figure 7:
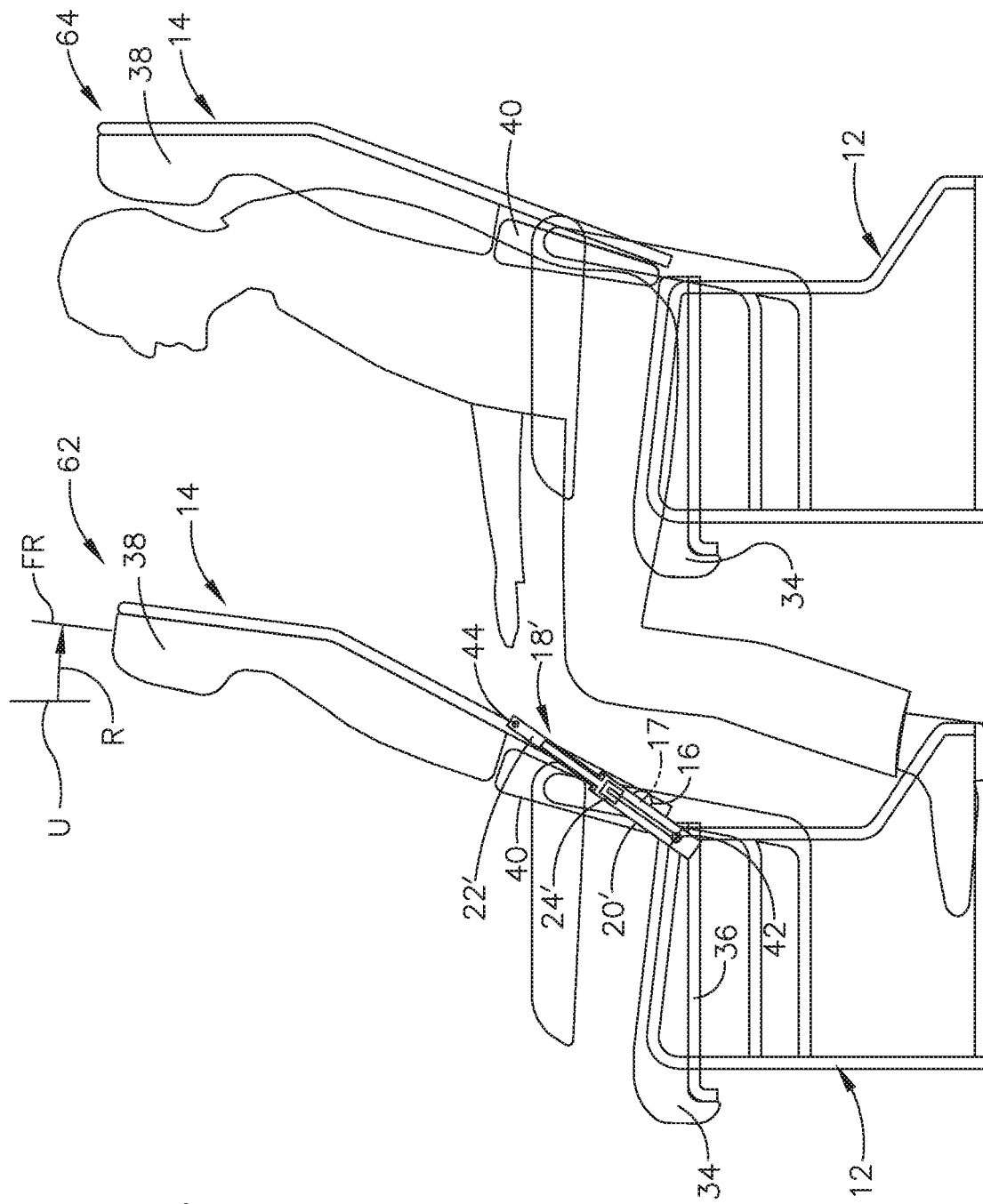
FIG. 7 is the view of the second example of the transformable seat assembly of FIG. 6 with the transformable seat assembly in a first reclined position.
Figure 8:
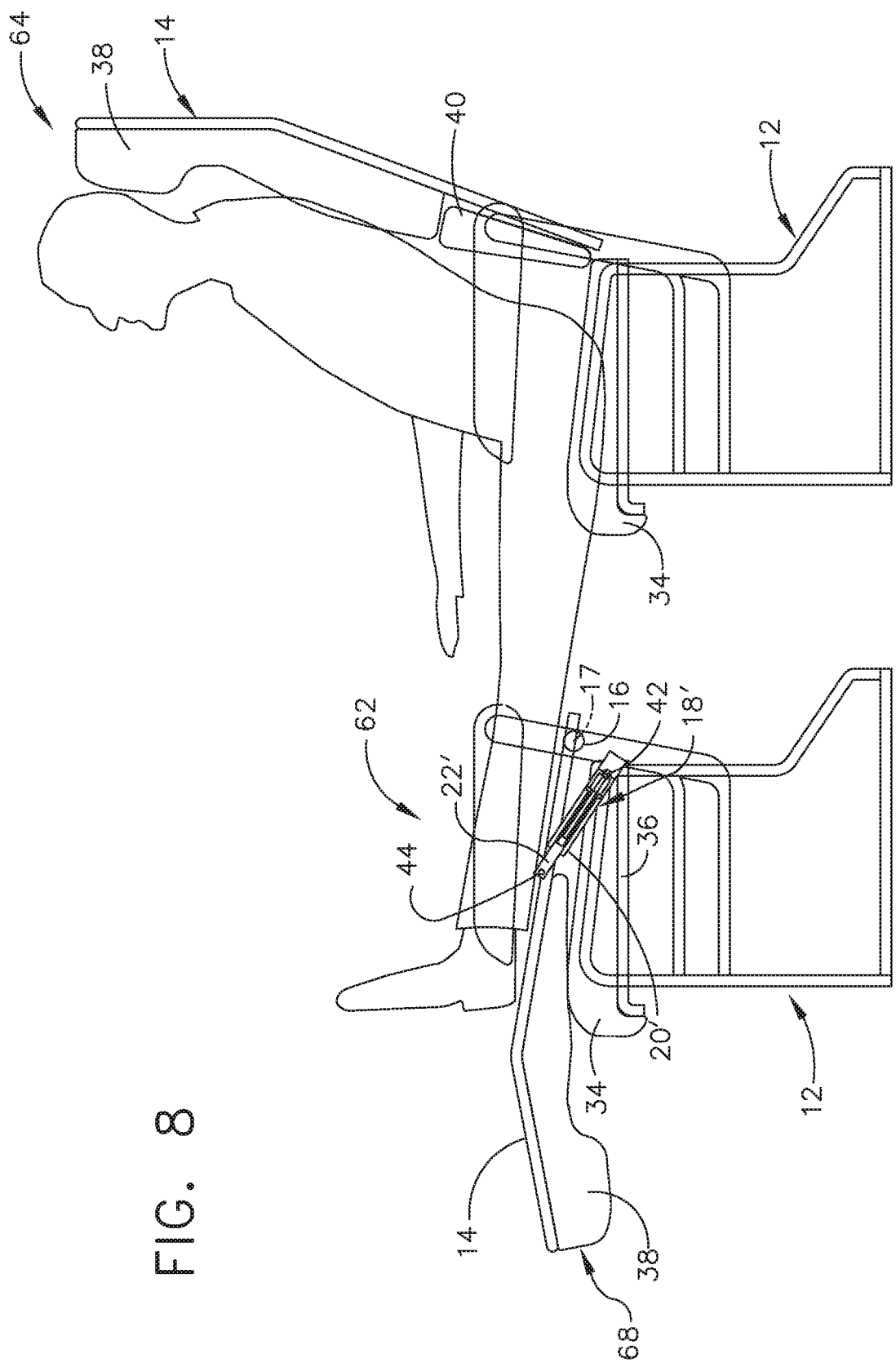
FIG. 8 is the view of the second example of the transformable seat assembly of FIG. 6 with a back support structure rotated forward providing extended leg room for the occupant of the occupied seat assembly positioned behind and adjacent to the second example of the transformable seat assembly.

In referring to FIGS. 6-8 second example of transformable seat assembly 62 example includes seat support structure 12 and back support structure 14 connected to seat support structure 12 with hinge 16, which defines an axis of rotation 17. Actuator assembly 18' includes cylinder 20' and piston 22' positioned within cylinder 20'. Cylinder 20' is secured to one of back support structure 14 or seat support structure 12. In this example cylinder 20' is secured to seat support structure 12. Piston 22' is secured to the other of the one of back support structure 14 or seat support structure 12 and in this example is secured to back support structure 14. In this second example, seat assembly 62 has actuator assembly 18' wherein cylinder 20' is pivotally secured to one of back support structure 14 or seat support structure 12 and in this example cylinder 20' is pivotally secured to seat support structure 12 with pivot connector 42. In this second example, seat assembly 62 has actuator assembly 18' wherein piston 22' is pivotally secured to one of back support structure 14 or seat support structure 12 and in this example piston 22' is pivotally secured to back support structure 14 with pivot connector 44.

Blocking member 24' is positioned within and adjustable along cylinder 20'. Blocking member 24', as shown in FIGS. 9A and 9B, is shown in first position 26', wherein first position 26' is the same position for second example of transformable seat assembly 62 in FIGS. 9A and 9B. In FIG. 6, in this example, back support structure 14 is positioned in upright position U. Back support structure 14, for example, is locked in position with traditional locking and unlocking engagements for such second example of transformable seat assembly 62, which can be found in use as mentioned above within an aircraft passenger seat for example. An occupant can sit down on transformable seat assembly 62 and the occupant can choose to recline back support structure 14. At that time the occupant can push an actuator button, not shown, which can unlock a locking securement of back support structure 14 and allow occupant to rotate back support structure 14, about axis of rotation 17 of hinge 16 in direction R as seen in FIG. 7 to first reclined position FR. With transformable seat assembly 62 positioned in upright position U, as seen in FIG. 6, piston 22' is positioned abutting blocking member 24' as seen in FIG. 9A. With blocking member 24' in first position 26', piston 22' has piston head 23' is permitted to travel between abutting blocking member 24' in first limit position 30' limiting linear travel of piston 22' in first direction 28 and end 58 of cylinder 20' spaced apart in an opposing second direction 66 from blocking member 24', such that with piston head 23' traveling to end 58 of cylinder 20', rotational travel of the back support structure 14, about axis of rotation 17, is limited from rotating back support structure 14 beyond first reclined position FR, as seen in FIG. 7.

In second example of transformable seat assembly 62, an occupant can sit down and choose to recline back support structure 14. At that time, occupant, as mentioned above, can push an actuator button, not shown, which unlocks a locking securement of back support structure 14 and allows occupant to rotate back support structure 14 in direction R as shown in FIG. 7 to first reclined position FR. However, with transformable seat assembly 62 being unoccupied, with blocking member 24' in second position 33' as seen in FIG. 9C, blocking member 24' permits linear travel of piston 22' in first direction 28 relative to cylinder 20' beyond first limiting position 30' such that rotational travel of back support structure 14, about axis of rotation 17, rotates into overlying position 68, as seen in FIG. 8, relative to seat support structure 12. With back support structure 14 in overlying position with respect to seat support structure 12, occupant of seat assembly 64 is provided an opportunity to extend their legs outwardly and rest them upon back support structure 14. The rotation of back support structure 14 provides occupant of seat assembly 64 an opportunity to utilize unused space of unoccupied transformable seat assembly 62 to optimize comfort to occupant of seat assembly 64.

As earlier mentioned seat cushion 34 is in an overlying position to seat support structure 12 and back cushion 38 and lumbar cushion 40 is in an overlying position relative to back support structure 14. Lumbar cushion 40, in this example, is releasably secured to at least one of back cushion 38 or back support structure 14. Releasable securement can be achieved by one of a number of securement arrangements such as for example with snaps or by way of a sheet of one of a plurality of flexible hooks or loops secured to lumbar cushion and another sheet of other of the plurality of flexible hooks or loops secured to at least one of the back support structure 14 or back cushion 38. Bringing these sheets together engage the plurality of flexible hooks and loops providing a releasable securement. This releasable securement can permit removal of lumbar cushion 40, as seen removed in FIG. 8, which permits positioning back support structure 14 in overlying position overlying seat support structure 12 without lumbar cushion 40 providing any obstruction to attaining the overlying position 68. With lumbar cushion 40 removed from the overlying position with respect to back support structure 14 and back support structure 14 is rotated about axis of rotation 17 and positioned in overlying relationship with respect to the seat support structure 12, back cushion 38 is positioned in contact with seat cushion 34 providing a desirable elevation for which legs of occupant of seat assembly 64 can rest upon back support structure 14 of transformable seat assembly 62.

In addition, cylinder 20' is pivotally secured to one of back support structure 14 or seat support structure 12. Piston 22' is pivotally secured to one of the other of the back support structure 14 or seat support structure 12. The pivotal securement permits rotation of cylinder 20', in this example, relative to seat support structure 12 with back support structure rotating about axis of rotation 17 and permits rotation of piston 22', in this example, relative to back support structure 14 with back support structure 14 rotating about axis of rotation 17, as seen in FIG. 8.

Figure 9:
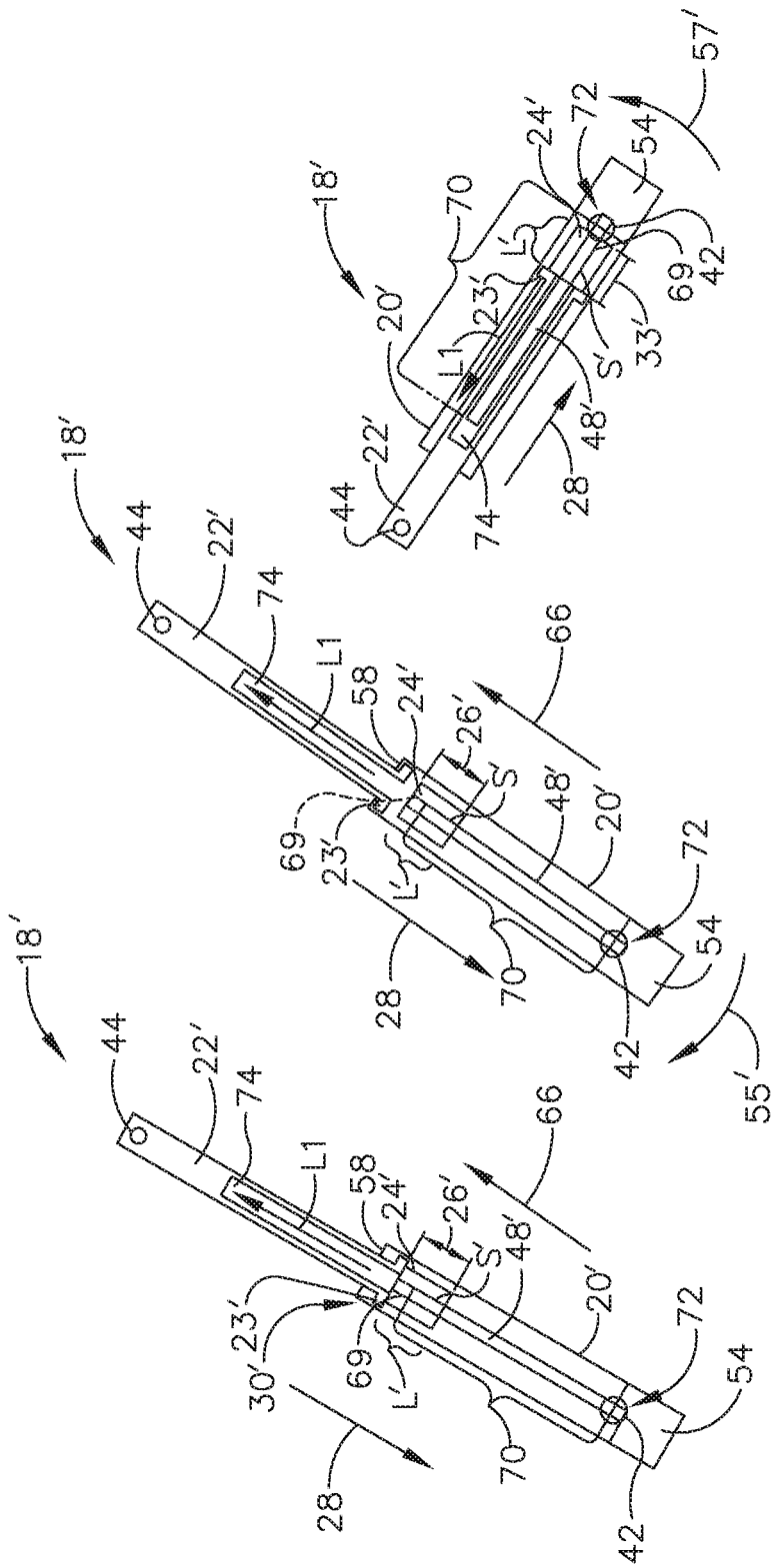
FIG. 9A is an enlarged view of the actuator assembly of FIG. 6.
FIG. 9B is an enlarged view of the actuator assembly of FIG. 7.
FIG. 9C is an enlarged view of the actuator assembly of FIG. 8.

To attain the positions of back support structure 14 to be in upright position U, first reclined position FR and an overlying position 68 relative to seat support structure 12 as shown in FIGS. 8-9C, blocking member 24' of actuator assembly 18' includes opening 69 defined by blocking member 24', which extends along length L' and through blocking member 24'. A plurality of threads (not shown) defined by blocking member 24' are positioned along surface S' of opening 69 within blocking member 24'. Threaded shaft 48' associated with the plurality of threads (not shown) defined by blocking member 24', wherein threaded shaft 48' defines plurality of threads (not shown) compatible with the plurality of threads (not shown) defined by blocking member 24'. First end portion 70 of threaded shaft 48', as seen in FIGS. 9A-C, engages the plurality of threads (not shown) defined by blocking member 24'. Second end portion 72 of threaded shaft 48' is connected to motor 54, which imparts rotation to threaded shaft 48' resulting in linear movement of blocking member 24' along cylinder 20'. In addition, in this example, piston 22' defines opening 74 which extends within and along length L1 of piston 22'. With motor 54 activated to rotate threaded shaft 48' in first rotational direction 55', in this example as seen in FIG. 9B, blocking member 24' travels from first position 26' to second position 33' as seen in FIG. 9C. With piston head 23' abutting blocking member 24' and blocking member 24' moving toward second position 33', threaded shaft 48' extends through and beyond opening 69 in blocking member 24', as seen in FIG. 9C, and into opening 74 defined by piston 22', which extends within and along length L1 of piston 22'. With blocking member 24' in second position 33' rotation of threaded shaft 48' by motor 54 in second rotational direction 57', in this example as seen in FIG. 9C, moves blocking member 24' along threaded shaft 48' and toward first position 26', as seen in FIGS. 9A and 9B. With blocking member 24' in first position 26' with piston head 23' in abutting relationship to blocking member 24', back support structure 14 is positioned in upright position U, as seen in FIGS. 6 and 9A. With piston head 23' positioned at end 58 of cylinder 20', back support structure 14 is positioned in first reclined position FR, as seen in FIGS. 7 and 9B. With piston head 23' abutting blocking member 24' with blocking member in second position 33', as seen in FIG. 9C, back support structure 14 is in overlying position 68 with respect to seat support structure 12, as seen in FIG. 8. With back support structure 14 in overlying position 68 with respect to seat support structure 12, occupant of seat assembly 64 can optimize their comfort with use of available space with transformable seat assembly 62 being unoccupied with resting their legs upon back support structure 14.

Figure 10:
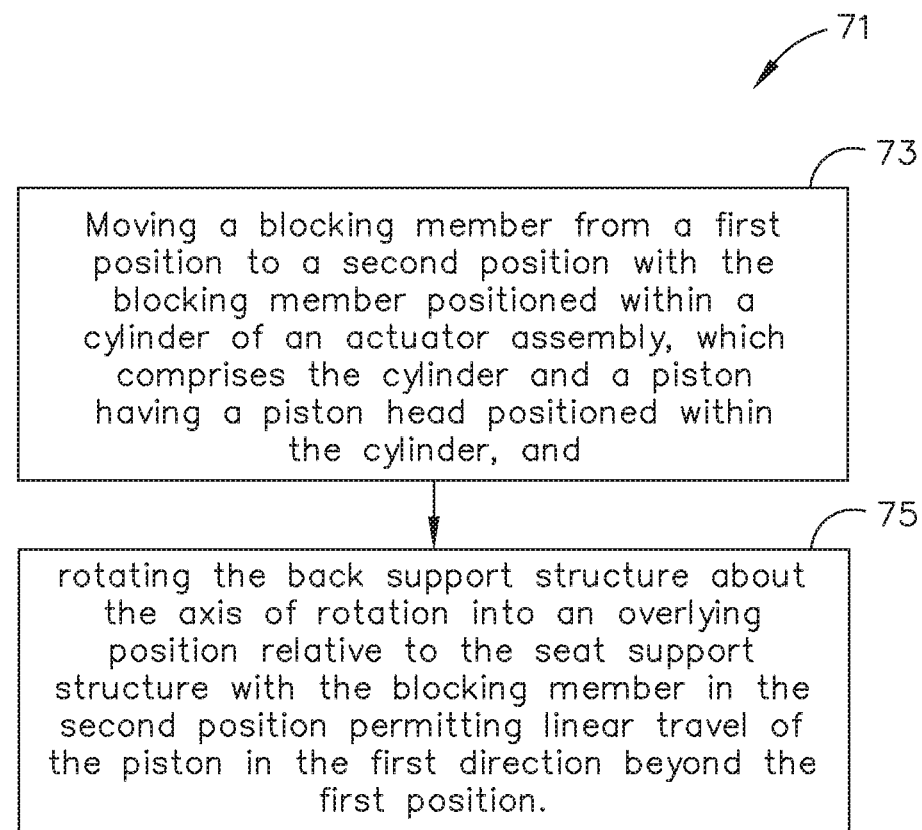
FIG. 10 is a flow chart of a method for transforming the second example of the transformable seat assembly of FIG. 6.

Method 71 for transforming transformable seat assembly 62, includes step 73, as seen in FIG. 10, of moving blocking member 24' positioned within cylinder 20' of actuator assembly 18', which includes cylinder 20' and piston 22' having piston head 23' positioned within cylinder 20', from first position 26' to second position 33'. Transformable seat assembly 62 includes seat support structure 12 connected to back support structure 14 with hinge 16, which defines axis of rotation 17. Cylinder 20' is secured to one of back support structure 14 or seat support structure 12 and piston 22' is secured to the other of the one of the back support structure 14 or seat support structure 12. With blocking member 24' in first position 26', piston head 23' is permitted to travel between, abutting blocking member 24' in a first limit position 30' limiting linear travel of piston 22' in first direction 28 and end 58 of cylinder 20' positioned spaced apart in opposing second direction 66 from blocking member 24', such that with piston head 23' traveling to end 58 of cylinder 20', rotational travel of back support structure 14 about axis of rotation 17 is limited from rotating back support structure 14 beyond first reclined position FR. Method 71 further includes step 75 of rotating back support structure 14 about axis of rotation 17 into an overlying position relative to the seat support structure 12 with blocking member 24' in second position 33' permitting linear travel of piston 22' in first direction 28 beyond first limit position 30'.

Transformable seat assembly 62 further includes seat cushion 34 positioned in overlying relationship to seat support structure 12 and back cushion 38 and lumbar cushion 40 positioned in overlying relationship to back support structure 14. Lumbar cushion 40, in this example, as described earlier is releasably secured to back support structure 14. Method 71 further includes, in this example, removing lumbar cushion 40 from back support structure 14 for facilitating placing back support structure 14 in overlying position 68 with respect to seat support structure 12 as earlier described.

With cylinder 20' pivotally secured to one of back support structure 14 or seat support structure 12 and piston 22' pivotally secured to other of the one of back support structure 14 or seat support structure 12, rotating back support structure 14 about axis of rotation 17 includes cylinder 20' pivotally rotating relative to the one of the back support structure 14 or seat support structure 12 and includes piston 22' pivotally rotating relative to the other of the one of the back support structure 14 or seat support structure 12.

Step 73 of moving blocking member 24' positioned within cylinder 20' further includes activating motor 54 to rotate threaded shaft 48'. Opening 69 defined by blocking member 24' extends along length L' of and through blocking member 24'. Plurality of threads (not shown) which are defined by blocking member 24' are positioned along surface S' of opening 69 within blocking member 24'. Threaded shaft 48', associated with the plurality of threads (not shown) defined by blocking member 24', defines plurality of threads (not shown) which are compatible with plurality of threads (not shown) defined by blocking member 24'. Plurality of threads (not shown) of first end portion 70 of threaded shaft 48' engage the plurality of threads (not shown) defined by blocking member 24' and a second end portion 72 of threaded shaft 48' is connected to motor 54, as seen in FIGS. 9A-C. Motor 54 imparts rotation to threaded shaft 48' resulting in linear movement of blocking member 24' along threaded shaft 48' and along cylinder 20'.

With rotating of threaded shaft 48' by motor 54 in first rotational direction 55', as seen for example in FIG. 9B, blocking member 24' moves from first position 26' to second position 33' as seen in FIG. 9C. With the piston head 23' abutting blocking member 24' and blocking member 24' moving toward second position 33', threaded shaft 48' extends through and beyond opening 69 in blocking member 24' and into opening 74 which extends within and along length L1 of piston 22', as seen in FIG. 9C. With threaded shaft 48' positioned within opening 69 of piston 22', back support structure 14 is overlying position 68 with respect to seat support structure as seen in FIG. 8. With blocking member 24' in second position 33', as seen in FIG. 9C, rotation of threaded shaft 48' by motor 54 in second rotational direction 57' moves blocking member 24' along threaded shaft 48' and toward first position 26' such that with blocking member 24' in first position 26', as seen in FIG. 9A, and piston head 23' abuts blocking member 24', back support structure 14 is positioned in upright position U, as seen in FIG. 6. With piston head 23' positioned at end 58 of cylinder 20', as seen in FIG. 9B, back support structure 14, as seen in FIG. 7, is positioned in first reclined position FR. With piston head 23' positioned abutting blocking member 24' with block member in second position 33', back support structure 14 is in overlying position 68 with respect to seat support structure 12 such that occupant of seat assembly 64 can rest their legs upon back support structure 14 optimizing comfort to the occupant with utilizing unoccupied transformable seat assembly 62.

Figure 11:
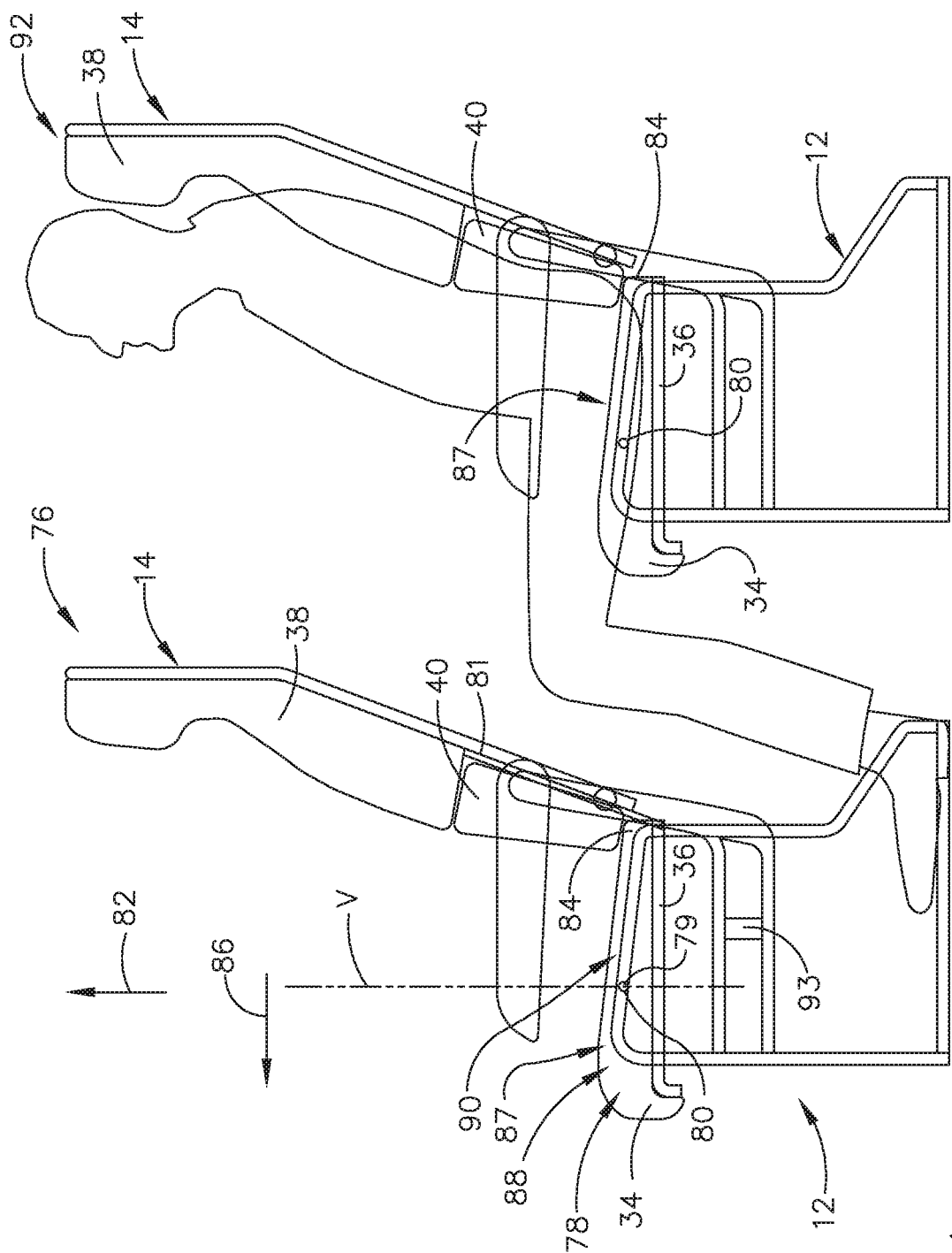
FIG. 11 is a side elevation schematic view of a first embodiment of a third example of a transformable seat assembly which is unoccupied and an occupant occupying a seat assembly positioned behind and adjacent to the third example of the transformable seat assembly.
Figure 12:
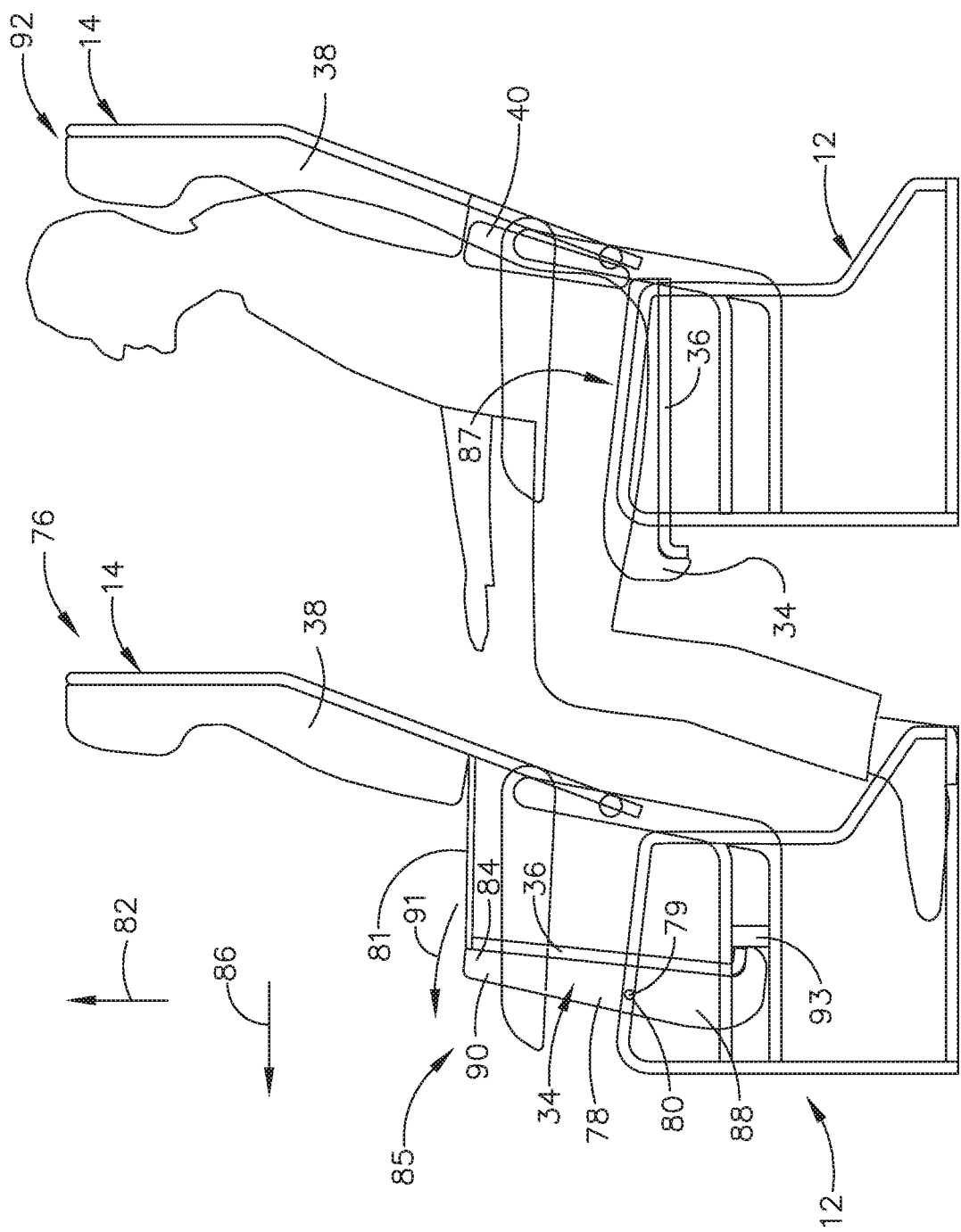
FIG. 12 is the view of the first embodiment of the third example of the transformable seat assembly of FIG. 11 with a lumbar cushion removed from the unoccupied the transformable seat assembly and the seat of the transformable seat assembly rotated forward providing the occupant of the seat assembly positioned behind and adjacent to the first embodiment of the third example of the transformable seat assembly more usable knee room.
Figure 17:
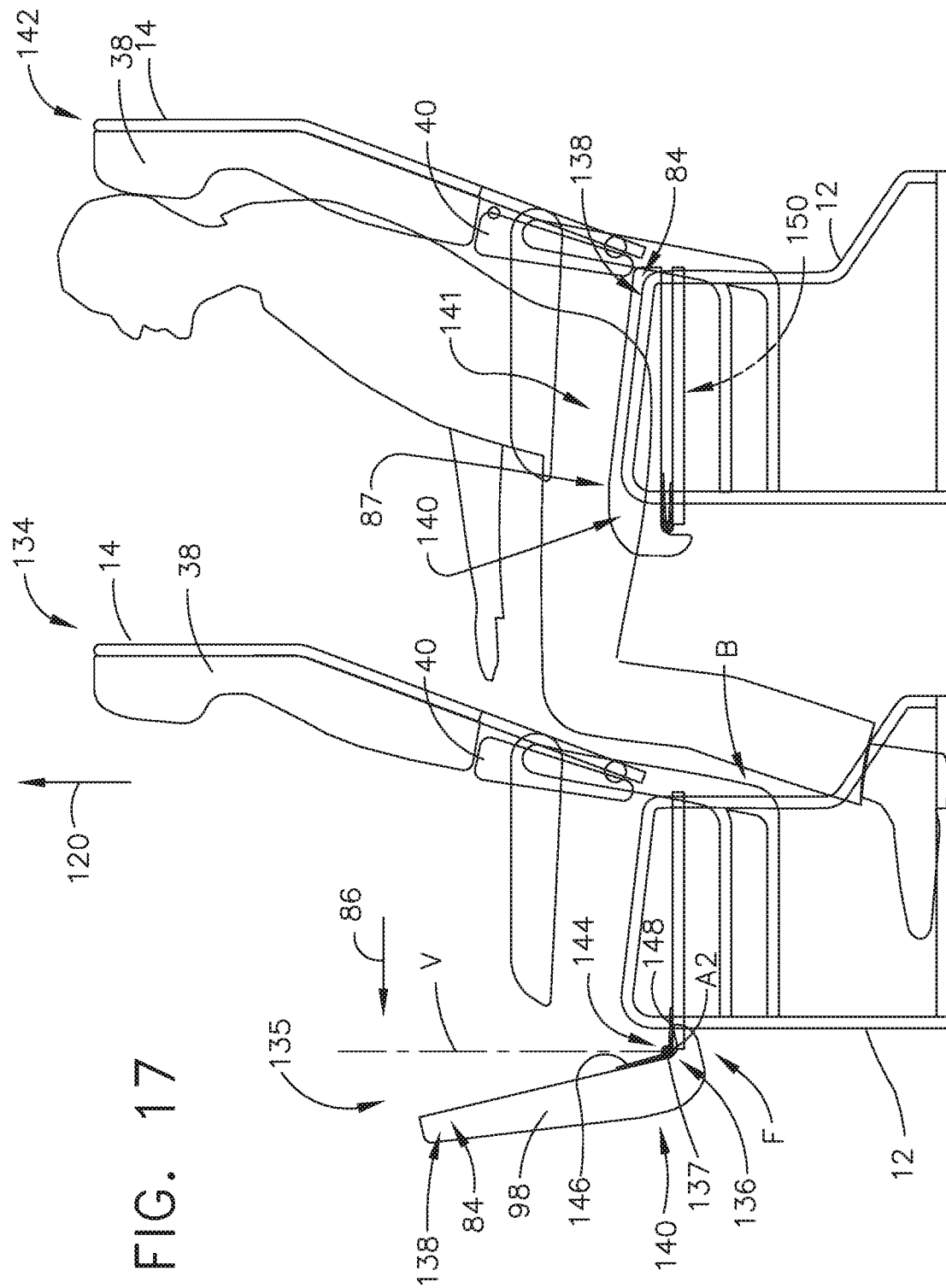
FIG. 17 is a side elevation schematic view of a second embodiment of the third example of the transformable seat assembly with a seat rotated relative to a seat support structure.
Figure 18:
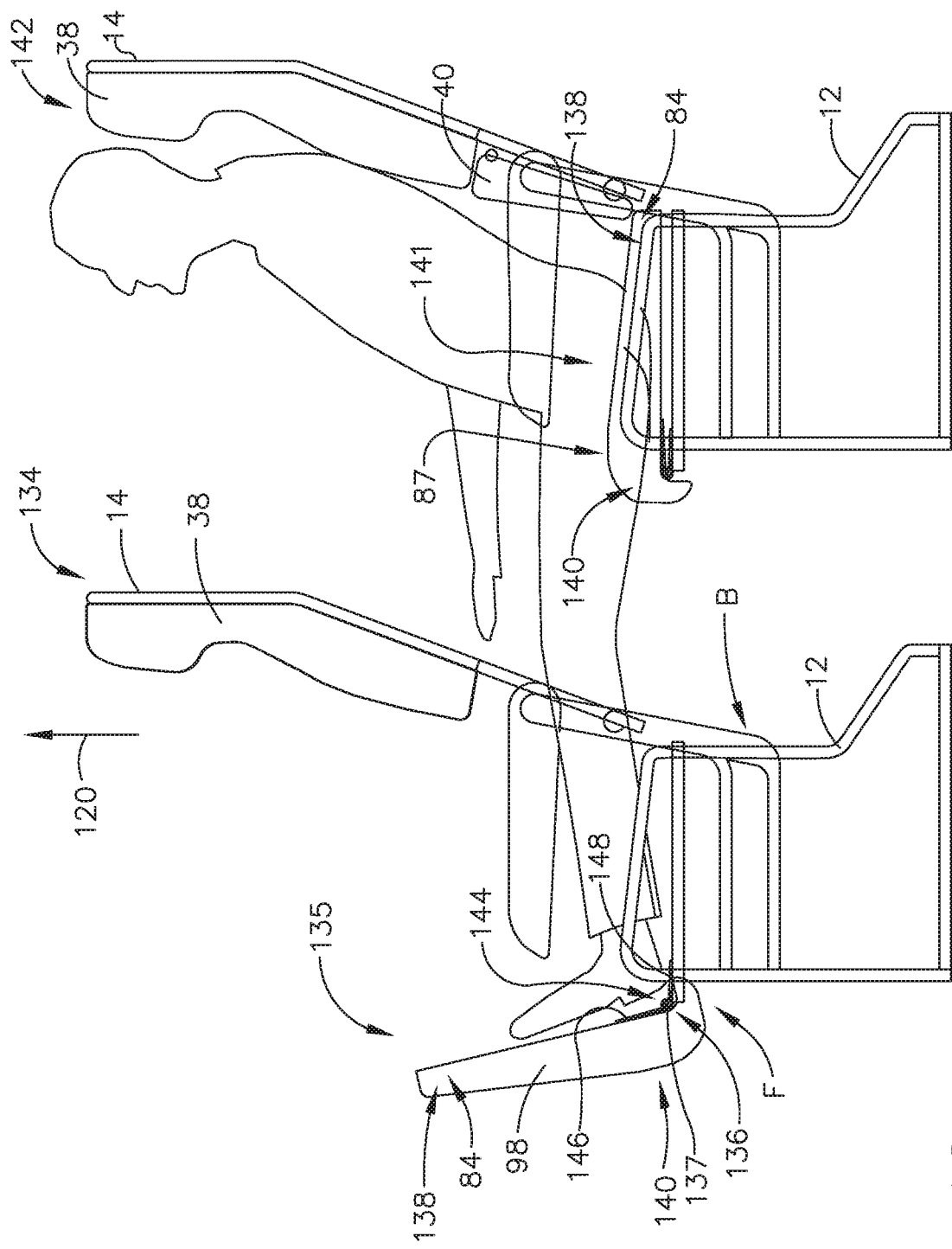
FIG. 18 is a view of the second embodiment of the third example of the transformable seat assembly of FIG. 17 with a lumbar cushion removed providing an occupant, of a seat assembly positioned behind and adjacent to the second embodiment of the third example of the transformable seat assembly, the ability to extend their legs and support their legs with a seat support structure of the second embodiment of the third transformable seat assembly.
Figure 19:
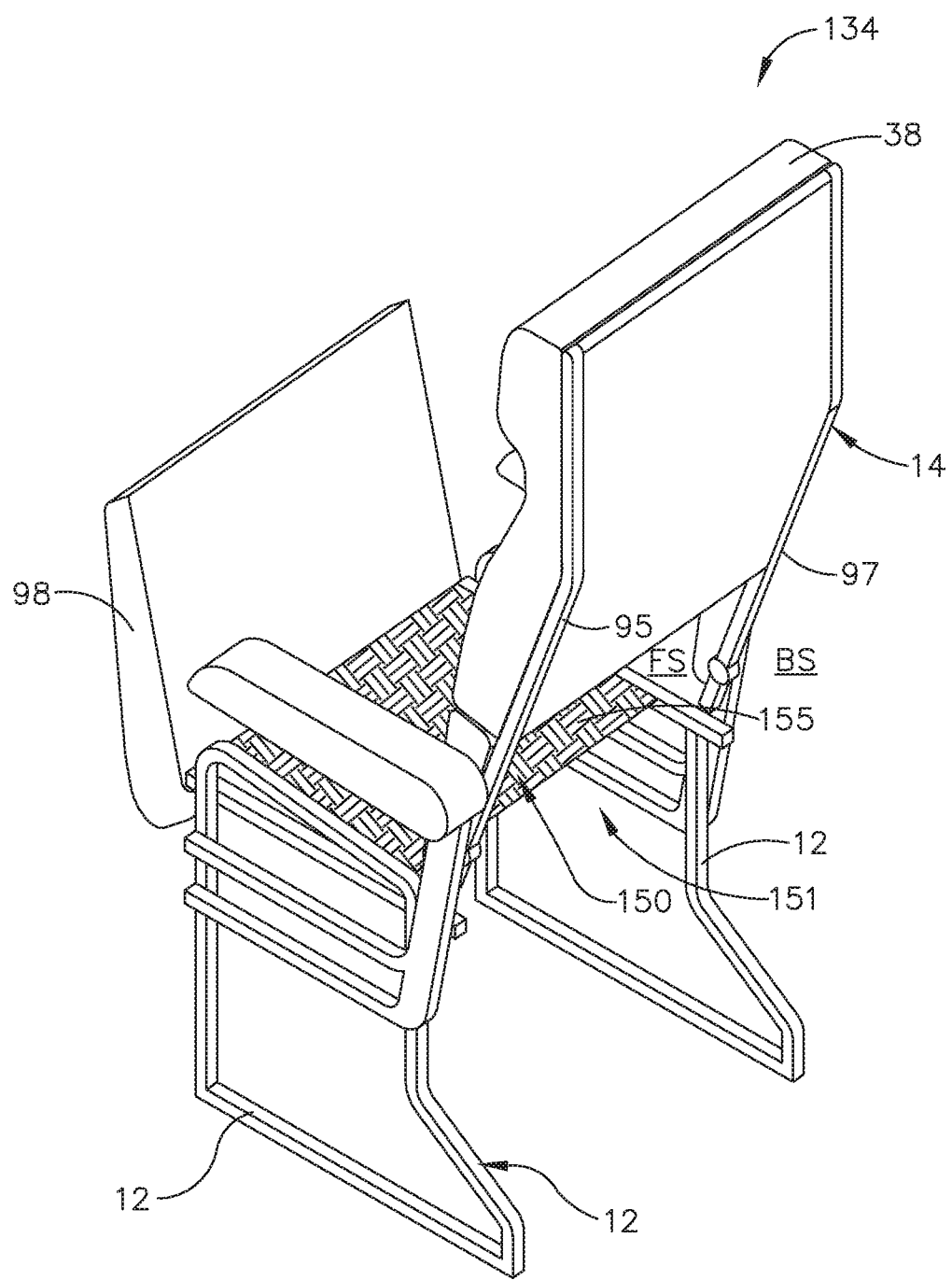
FIG. 19 is a schematic rear perspective view of the second embodiment of the third example of the transformable seat assembly of FIG. 17.

In referring to FIGS. 11 and 12, a first embodiment of third example of transformable seat assembly 76 is shown and in referring to FIGS. 17-19, a second embodiment of third example of transformable seat assembly 134 is shown. In referring to FIGS. 11 and 12, transformable seat assembly 76 includes seat support structure 12 and seat 78 connected to seat support structure 12 with hinge 80. Hinge 80 defines axis of rotation 79 which provides for rotation of seat 78 in direction of rotation 91 relative to seat support structure 12, as seen in FIG. 12. Back support structure 14 is connected to seat support structure 12 and extends in upward direction 82 relative to seat support structure 12. Back cushion 38 is secured to back support structure 14 and lumbar cushion 40, as seen in FIG. 11, extends along back support structure 14 positioned between back cushion 38 and seat 78. Lumbar cushion 40 is releasably secured to one of back cushion 38 and back support structure 14. This releasable securement can be provided with, for example, use of a first sheet (not shown) of a plurality of one of flexible hooks (not shown) or flexible loops (not shown) that is secured to lumbar cushion 40 and second sheet (not shown) of a plurality of the other of one of flexible hooks (not shown) or flexible loops (not shown) that is secured to at least one of back support structure 14 or back cushion 38 such that first sheet (not shown) and the second sheet (not shown) releasably secure to one another with engagement of the flexible loops and the flexible hooks. As a result, lumbar cushion 38 can maintain position with respect to transformable seat assembly 76 with transformable seat assembly 76 occupied and can be removed from back cushion 38 and/or back support structure 14 when transformable seat assembly 76 is unoccupied and lumbar cushion 40 is not required.

End portion 84 of seat 78 is positioned closer to back support structure 14 than hinge 80 with seat 78 positioned in an occupant support position 87, as seen in FIG. 11 wherein seat 78 is in overlying relationship to seat support structure 12. End portion 84 of seat 78 can be rotated in direction of rotation 91 about axis of rotation 79 of hinge 80, as seen in FIG. 12, which includes upward direction 82 and direction 86 away from back support structure 14. In first embodiment of third example of transformable seat assembly 76, as seen in FIG. 12, with seat 78 rotated from an occupant support position 87 and lumbar cushion 40 removed occupant of seat assembly 92 removes seat 78 and lumbar cushion 40 as an obstacle to occupant of seat assembly 92. Occupant of seat assembly 92, as a result, acquires additional knee space and enhanced comfort to occupant with transformable seat assembly 76 being unoccupied, as will be described in more detail.

Seat 78 includes in this example, seat cushion 34 overlies and is supported with seat support frame 36 of seat support structure 12. In the first embodiment of third example of transformable third seat assembly 76, seat 78 includes first portion 88 and second portion 90 separated by vertical plane V which extends through axis of rotation 79 of hinge 80, as seen in FIG. 11. First portion 88 is positioned further from back support structure 14 than second portion 90, with seat 78 in occupant support position 87. First portion 88 has a first weight and second portion 90 has a second weight such that the first weight is greater than the second weight. Seat 78 can rotate in direction of rotation 91, as seen in FIG. 12, to stop member 93 secured to seat support structure 12 and positioned within the travel of seat 78. Stop member 93 blocks any further rotation of seat 78 and first weight of first portion 88 of seat 78 maintains seat 78 in the rotated position as seen in FIG. 12.

Further included in this example, is connector member 81 which is connected to back support structure 14 and is secured to second portion 90 of seat 78. Connector member 81 can be constructed of a flexible material such as nylon or other strong flexible material or can be constructed of a more rigid material such as metal or plastic and rotatably secured to second portion 90 of seat 78 and rotatably secured to back support structure 14. Connector member 81 can be used in addition to or in replacement of stop member 93 to prevent over rotation of seat 78 with seat 78 rotated in direction of rotation 91.

With occupant positioned in seat assembly 92, which is positioned behind and adjacent to first embodiment of third example of transformable seat assembly 76 is unoccupied, occupant of seat assembly 92 can have an option of removal of lumbar cushion 40 and rotation of end portion 84 of seat 78 in direction of rotation 91 about hinge 80. Seat 78 includes, in this example and mentioned earlier, seat cushion 34 and seat support frame 36 upon which the seat cushion 34 is supported and overlies. Removal of lumbar cushion 40 and rotation of seat 78, which includes seat cushion 34 and seat support frame 36, removes lumbar cushion 40 and seat 78 as obstacles with respect to occupant of seat assembly 92 accessing usable space of transformable seat assembly 76 of FIG. 12.

In this first embodiment of the third example of transformable seat assembly 76, as seen in FIGS. 11 and 12, with lumbar cushion 40 removed from between back cushion 38 and seat 78, access, as seen in FIG. 19, is provided from back side BS of back support structure 14 to beyond front side FS of back support structure 14 through an opening 151, as seen for an example in FIG. 19, defined by first support structure 95 spaced apart from second support structure 97 of back support structure 14. In addition with first end portion 84 of seat 78 rotated in direction of rotation 91 about hinge 80 from occupant support position 87, as seen in FIGS. 11 and 12, access is provided to space first end portion 84 of seat 78 occupied prior to being rotated from occupant support position 87. This transformation of first embodiment of second example of transformable seat assembly 76 provides occupant of seat assembly 92 an opportunity, as mentioned earlier, to obtain more knee room and enhanced comfort with transformable seat assembly 76 unoccupied.

In referring to FIGS. 17-18, second embodiment of third example of transformable seat assembly 134 is shown including seat support structure 12 and seat 98 connected to seat support structure 12 with hinge 136. Hinge 136 is positioned on front side portion F of seat support structure 12 spaced apart from back support structure 14 in direction 86 away from back support structure 14. Seat 98 includes first end portion 138 which includes end portion 84 of seat 98 and second opposing end portion 140. With seat 98 in an occupant support position 141 as seen with respect to seat assembly 142 positioned behind and adjacent to transformable seat assembly 134, first end portion 138 is positioned closer to back support structure 14 than second opposing end portion 140. With seat 98 of transformable seat assembly 134 in a deployed position 135 rotated from occupant support position 141 about axis of rotation 137 of hinge 136, seat 98 extends in upward direction 120 away from seat support structure 12. In this example, seat 98 extends rotated in forward direction 86 beyond vertical plane V, as seen in FIG. 17. This position is resiliently maintained, in this example, with hinge 136 being torsion spring 144, wherein torsion spring 144 includes first arm 146 abutting seat 98 and second arm 148 abutting seat support structure 12.

In this example, seat 98 unused or unoccupied will be positioned in deployed position 135 as shown in FIGS. 17 and 18. Torsion spring 144 will maintain seat 98 in the deployed position until an occupant sits onto seat 98 rotating seat into occupied support position as seen with respect to seat assembly 142 wherein seat 98 is positioned into occupant support position 141 such that seat 98 overlies seat support structure 12 and seat support structure 12 provides support to the occupant and seat 98.

Second embodiment of third example of transformable seat assembly 134 includes back cushion 38 overlying back support structure 14. Seat 98 includes, in this example, seat cushion 34. Further included is lumbar cushion 40 positioned between back cushion 38 and seat cushion 34. As described earlier, lumbar cushion 40 is releasably secured to one of back support structure 14 or back cushion 38. With transformable seat assembly 134 unoccupied, occupant in seat assembly 142 positioned behind and adjacent to transformable seat assembly 134 can choose to have lumbar cushion 40 removed, as seen in FIG. 18.

In this example seat support structure includes a support structure 150, as seen for example in FIG. 19. Support structure 150 is positioned below seat 98 with seat 98 in occupant support position 141 as shown for example in FIGS. 17-19. Support structure 150 is accessible from a back side BS of back support structure 14 with lumbar cushion 40 removed, as seen in FIGS. 18 and 19, from back support structure 14 unblocking opening 151, as seen for example in FIG. 19, which is defined by first support structure 95 spaced apart from second support structure 97 of back support structure 14 and with first end portion 84 of seat 98 rotated about axis of rotation 137 away from occupant support position 141. Transformable seat assembly 134 provides occupant of seat assembly 142 additional usable space with respect to unoccupied transformable seat assembly 134. As a result, occupant as seen in FIG. 18, can extend their legs through to transformable seat assembly 134 wherein support structure 150, as seen for example in FIG. 19, can provide support to occupant's legs. In this example, support structure 150 includes webbing 152 secured to seat support structure 12 such that occupant of seat assembly 142 can have their legs supported with webbing 155.

In referring to FIG. 17, transformable seat assembly 134 includes seat support structure 12 and seat 98 connected to seat support structure 12 with hinge 136 having axis of rotation 137 which includes torsion spring 144 providing for rotation of seat 98 relative to seat support structure 12. Transformable seat assembly 134 further includes back support structure 14 connected to seat support structure 12 and back support structure 14 extends in upward direction 120 relative to seat support structure 12. Torsion spring 144 is positioned on front portion F of seat support structure 12 spaced apart from back support structure 14 in direction 86 away from back support structure 14. Torsion spring 144 resiliently maintains seat 98 extending away from seat support structure in deployed position 135. Lumbar cushion 40 is removably positioned in overlying position relation to back support structure 14. When seat 98 is occupied, as seen in FIG. 17, with seat assembly 142, seat 98 rotates about axis of rotation 137 of torsion spring 144 from deployed position 135 as seen in FIG. 17 with respect to transformable seat assembly 134, to occupant support position 141 with respect to seat assembly 142, with seat support structure 12 providing support to seat 98. When the seat becomes unoccupied, torsion spring 144 positions seat 98 with rotating seat 98 about axis of rotation 137 from occupant support position 141, as seen with respect to seat assembly 142, to deployed position 135 wherein seat 98 extends away from seat support structure. This positioning of seat 98 in deployed position 135 with seat 98 unoccupied provides many benefits to those for example who service an aircraft. The deployed position 135 provides for ease in cleaning underneath seats as well as for ease with respect to routine inspections.

Figure 20:
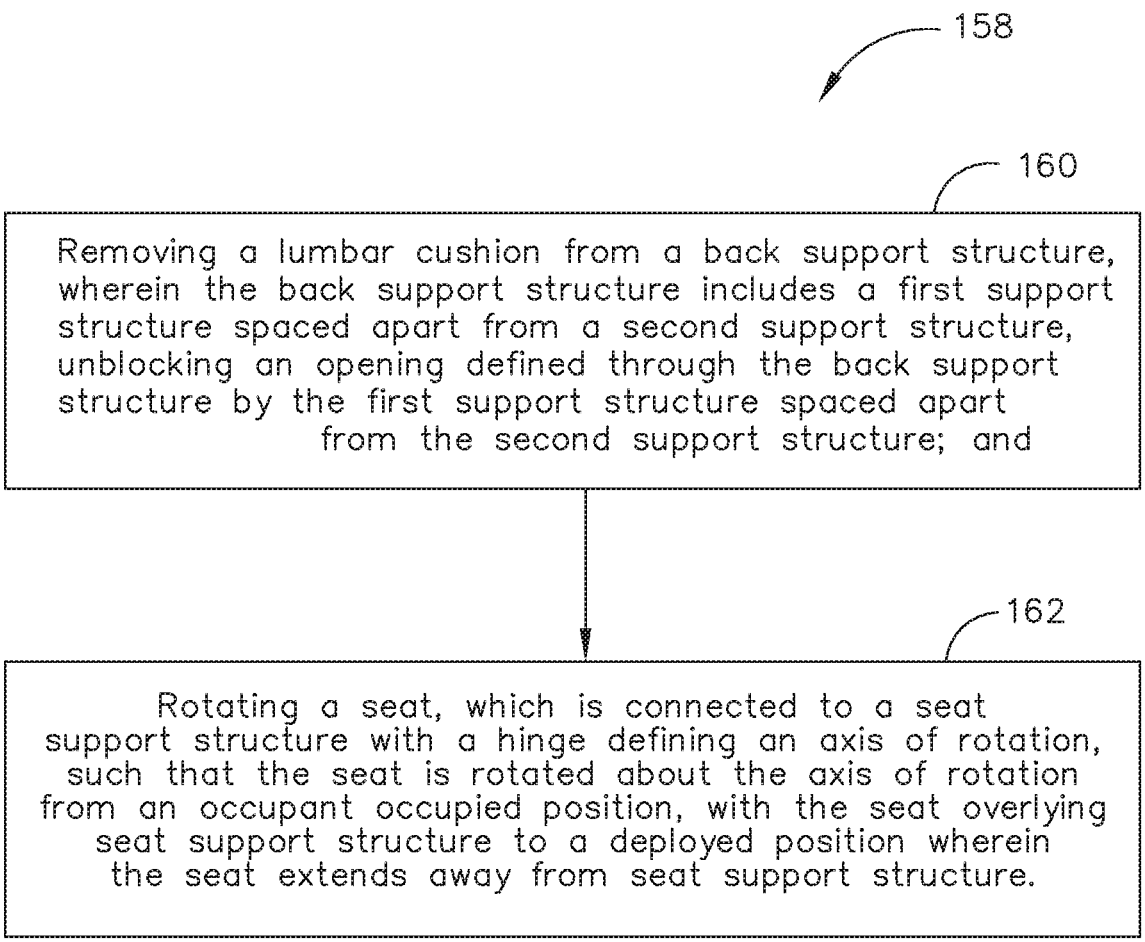
FIG. 20 a flow chart of a method for transforming the third example of the transformable seat assembly.

In referring to FIG. 20, method 158 for transforming transformable seat assembly, includes step 160 of removing lumbar cushion 40 from back support structure 14, wherein back support structure 14 defines opening 151 through back support structure 14, as seen for example in FIG. 19, and removal of lumbar cushion 40 unblocks opening 151.

Method 158 further includes step 162 of rotating a seat 78, which is connected to seat support structure 12 with hinge 80 defining axis of rotation 79, such that seat 78 is rotated about axis of rotation 79 from occupant support position 87, with seat 78 overlying seat support structure 12, to deployed position 85 wherein seat 78 extends away from seat support structure 12.

Step 160 of removing lumbar cushion 40 further includes disengaging lumbar cushion 40 from at least one of back cushion 38 secured to the back support structure 14 or back support structure 14. Disengaging in this example includes unsecuring releasably secured lumbar cushion 40 from one of back support structure 14 or back cushion 38 as discussed earlier with respect to lumbar cushion 40 being releasably secured to back support structure 14 or back cushion 38. Back support structure 14 defines opening 151, as seen for example in FIG. 19, with first support structure 95 of back support structure 14 spaced apart from second support structure 97 of back support structure 14. Step 162 of rotating seat 78 includes first end portion 84 of seat 78 positioned closer to back support structure 14 than hinge 80 with seat 78 in occupant support position 87, rotates in upward direction 82 away from seat support structure 12 and in direction 86 away from back support structure 14. Method 158 provides occupant of a seat assembly positioned adjacent and behind an unoccupied transformable seat assembly to access usable space of an unoccupied transformable seat assembly to enhance the occupant's comfort.

Figure 13:
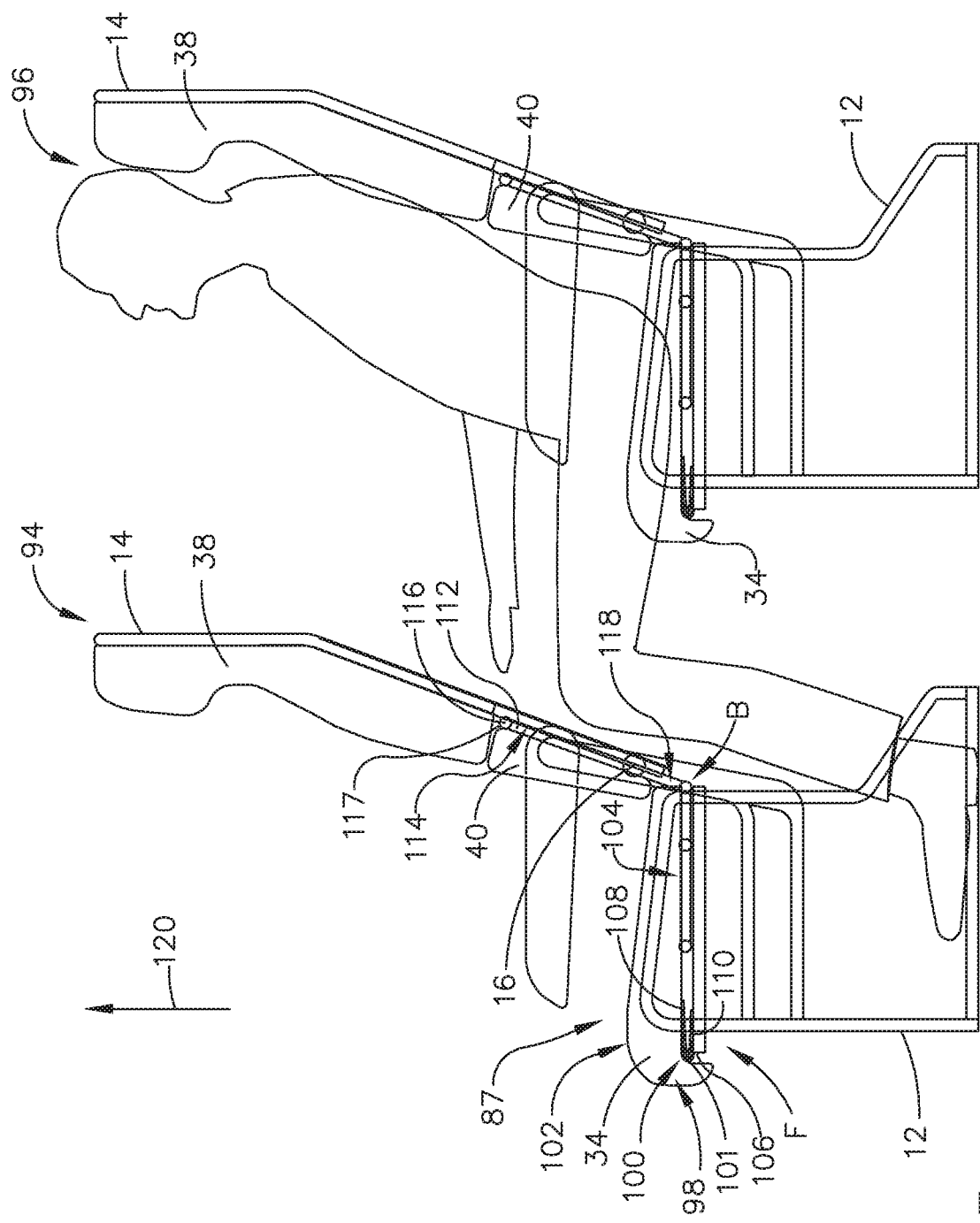
FIG. 13 is a side elevation schematic view of a fourth example of a transformable seat assembly which is unoccupied and an occupant occupying a seat assembly positioned behind and adjacent to the fourth example of the transformable seat assembly.
Figure 14:
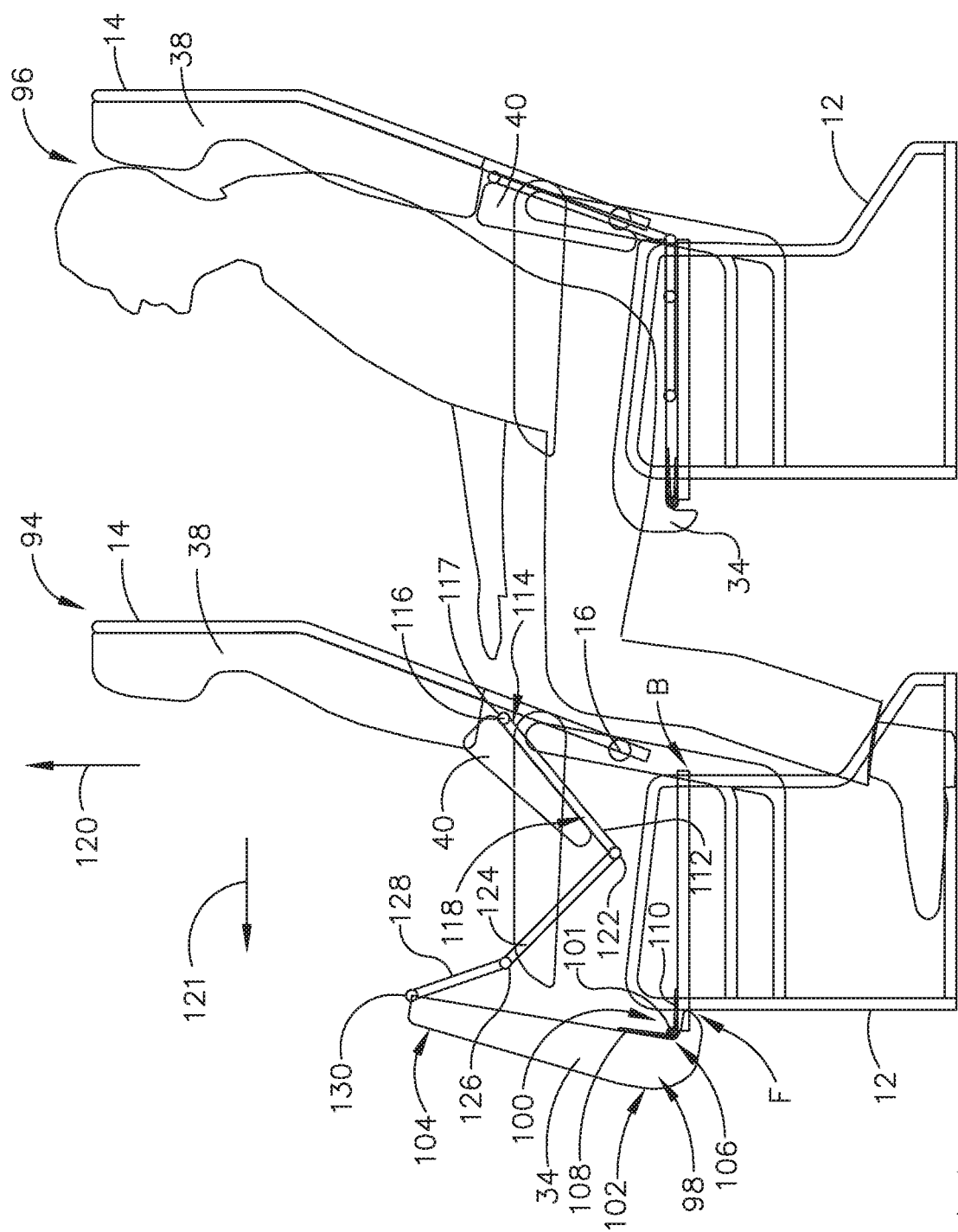
FIG. 14 is the view of the fourth example of the transformable seat assembly of FIG. 13 wherein a wall member with a lumbar cushion secured to the wall member rotates relative to a back support structure and a seat rotates relative to a seat support structure.
Figure 15:
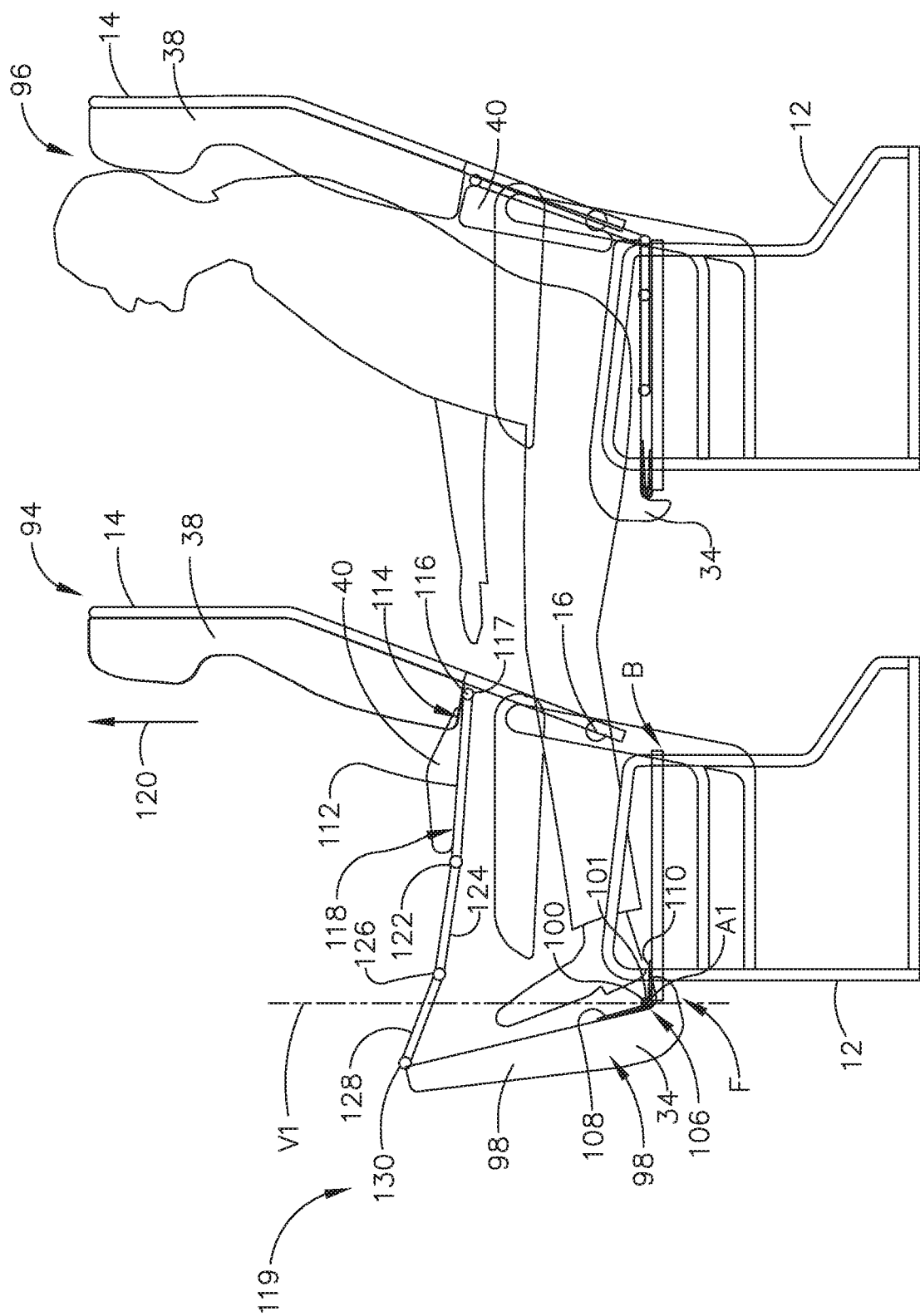
FIG. 15 is the view of the fourth example of the transformable seat assembly of FIG. 14 wherein the wall member with the lumbar cushion and the seat have fully rotated providing the occupant occupying the seat assembly positioned behind and adjacent to the fourth example of the transformable seat assembly an ability to extend their legs onto a seat support of the fourth example of the transformable seat assembly.

In referring to FIGS. 13-15, fourth example of transformable seat assembly 94 is shown in which fourth example of transformable seat assembly 94 includes seat support structure 12 and seat 98 connected to seat support structure 12 with first hinge 100, having first axis of rotation 101 which provides for rotation of seat 98 relative to seat support structure 12. In this example, seat 98 includes seat cushion 34. Back support structure 14 is connected to seat support structure 12, in this example, with hinge 16 and back support structure 14 is positioned on back side B of seat support structure 12. Back support structure 14 further includes back cushion 38 secured to back support structure 14. First hinge 100 is positioned on an opposing front side F of seat support structure 12.

Seat 98 has front end portion 102 and rear end portion 104 such that with seat 98 of fourth example of transformable seat assembly 94 in an occupant support position 87, as seen in FIG. 13, rear end portion 104 is positioned closer to back support structure 14 than front end portion 102. As seen in FIG. 11, front end portion 102 of seat 98 is positioned overlying first hinge 100. In this example, first hinge 100 includes a torsion spring 106 with first arm 108 of torsion spring 106 positioned against seat 98 and second arm 110 positioned against seat support structure 12. Front end portion 102 of seat 98 is positioned overlying first hinge 100.

Fourth example of transformable seat assembly 94 further includes wall member 112 having first end portion 114 connected to back support structure 14 with second hinge 116 having second axis of rotation 117. Transformable seat assembly 94 is rotatable about first axis of rotation 101 from an occupant occupying support position 87 overlying seat support structure 12, as seen in FIG. 13 to deployed position 119 extending away from seat support structure 12. Wall member 112 is rotatable about second axis of rotation 117 from an overlying position with respect to the back support structure 14 to wall member 112 extending away from back support structure 14 as seen in FIG. 15.

Lumbar cushion 40 is secured to wall member 112. With seat 98 in occupant occupying support position 87, as seen in FIG. 13, lumbar cushion 40 extends between back cushion 38 and seat cushion 34. With fourth example of transformable seat assembly 94 unoccupied, occupant of seat assembly 96, positioned behind and adjacent to fourth example of transformable seat assembly 94, can optimize use of unoccupied fourth example of transformable seat assembly 94 with rotation of second opposing end portion 118 of wall member 112. Wall member 112 rotates about second axis of rotation 117 of second hinge 116 and lumbar cushion 40 rotates with wall member 112. Second opposing end portion 118 of wall member 112 further includes third hinge 122 connecting wall member 112 to, in this example, second wall member 124, as seen in FIGS. 14 and 15. Second wall member 124 further includes fourth hinge 126 connecting second wall member 124 to third wall member 128. Third wall member 128 further includes fifth hinge 130 connecting the third wall member 128 to seat 98 wherein second opposing end portion of wall member 112 is linked to seat 98 in this example.

With the seat 98 in occupant occupying support position 87 as seen in FIG. 13, second and third wall members 124 and 128 fold with respect to each other and are positioned between seat 98 and seat support structure 12. Wall members can be constructed from one of a number of materials such as a film, plastic panel, metal panel and the like.

With seat 98 in deployed position 119 as seen in FIG. 15, seat 98 is positioned extending away from back support structure 14 and in this example extending away from vertical plane V1, which extends through central axis of rotation A1 of first hinge 100. In deployed position 119, seat 98 extends beyond vertical plane V1, the weight of seat 98 can facilitate maintaining seat 98 in deployed position 119. With the use of torsion spring 106, seat 98 can also be maintained in the deployed position 119. In addition, with seat 98 in deployed position 119, wall member 112, second wall member 124 and third wall member 128 are positioned spaced apart from at least a portion of seat support structure 12.

With seat 98 in deployed position 119 and wall member 112 rotated about second axis of rotation 117 of second hinge away from back support structure 14, wall member 112 unblocks opening 151, as seen as an example in FIG. 19. Opening 151 is defined by and through back support structure 14, for example, by first support structure 95 spaced apart from a second support structure 97 of back support structure 14. Opening 151 provides access from back side BS of back support structure 14 to front side FS of back support structure 14 and to support structure 150 of seat support structure 12. With occupant of seat assembly 96 positioned behind and adjacent to unoccupied fourth example of transformable seat assembly 94, occupant can access support structure 150 through opening 151 so as to utilize space of unoccupied fourth example of transformable seat assembly 94 to extend occupant's legs and rest them upon support structure 150 enhancing comfort to occupant of seat assembly 96.

Figure 16:
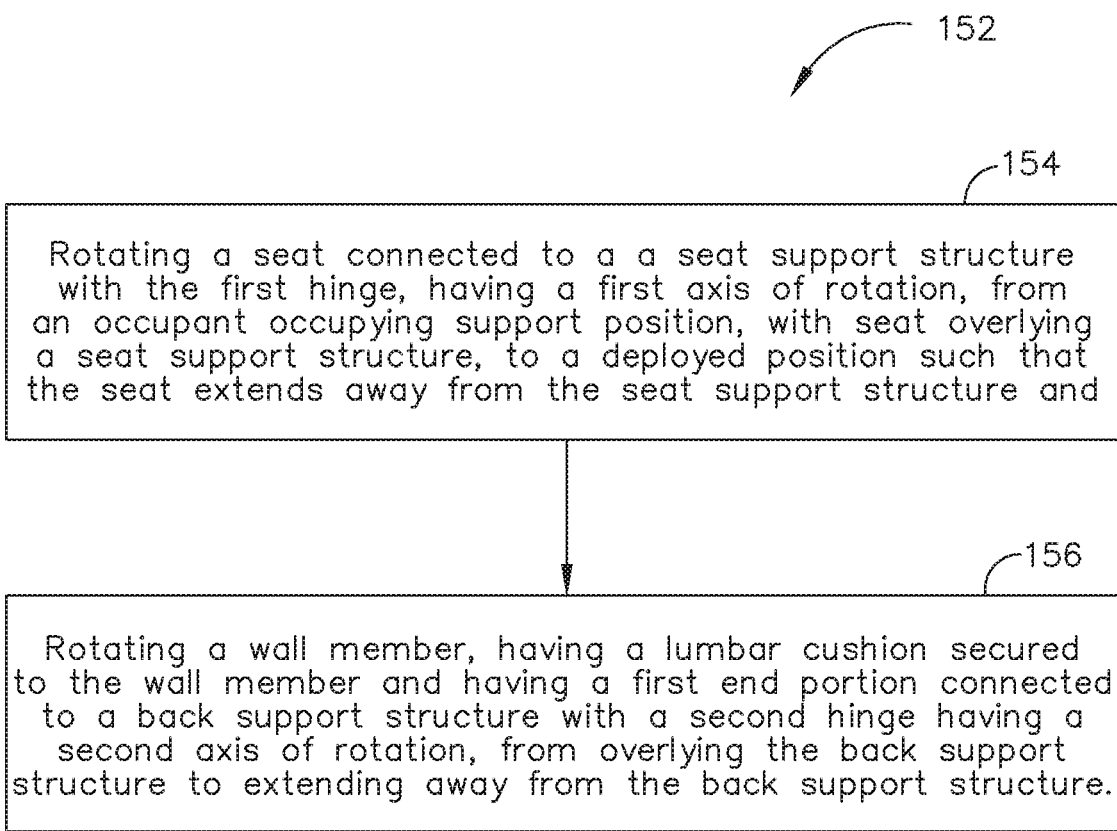
FIG. 16 is a flow chart of a method for transforming the fourth example of the transformable seat assembly of FIG. 13.

In referring to FIG. 16, method 152 for transforming fourth example of transformable seat assembly 94 is shown, which includes step 154 of rotating seat 98 connected to seat support structure 12 with first hinge 100, having a first axis of rotation 101, from an occupant occupying support position 87, with seat 98 overlying seat support structure 12, to a deployed position 119, such that seat 98 extends away from seat support structure 12. Method 152 further includes step 156 of rotating wall member 112, having a lumbar cushion 40 secured to wall member 112 and having a first end portion 114 connected to back support structure 14 with second hinge 116 having second axis of rotation 117, from overlying back support structure 14 to lumbar cushion 40 extending away from back support structure 14 as seen in FIG. 15, as seen in FIG. 15

Step 154 of rotating seat 98 to deployed position 119 positions seat 98 extending away from vertical plane V1 which extends through first axis of rotation 101 and extending away from back support structure 14. In this example, wall member 112 is linked to seat 98 such that with seat 98 in deployed position 119, wall member 112 is positioned spaced apart in upward direction 120 upward from seat support structure 12 and extending away from back support structure 14. Step 156 of rotating wall member 112 includes removing wall member 112 from blocking relationship with opening 151 defined by back support structure 14, as seen for example in FIG. 19 wherein first support structure 95 is spaced apart from second support structure 97 of back support structure defines opening 151. Opening 151 provides access from back side BS of back support structure 14 to front side FS of back support structure 14 and to support structure 150 of seat support structure 12 as seen for example in FIG. 19. As mentioned earlier, with occupant of seat assembly 96 positioned behind and adjacent to unoccupied fourth example of transformable seat assembly 94, occupant can access support structure 150 through opening 151 so as to utilize space of unoccupied fourth example of transformable seat assembly 94 to extend occupant's legs and rest them upon support structure 150 enhancing comfort to occupant of seat assembly 96.

The transformable seat assemblies and methods of transforming, adjusting, or reconfiguring such transformable seat assemblies disclosed above may be further used to improve the utilization of space associated with unoccupied seat assemblies in an organized seating arrangement, as described below.

Figure 21:
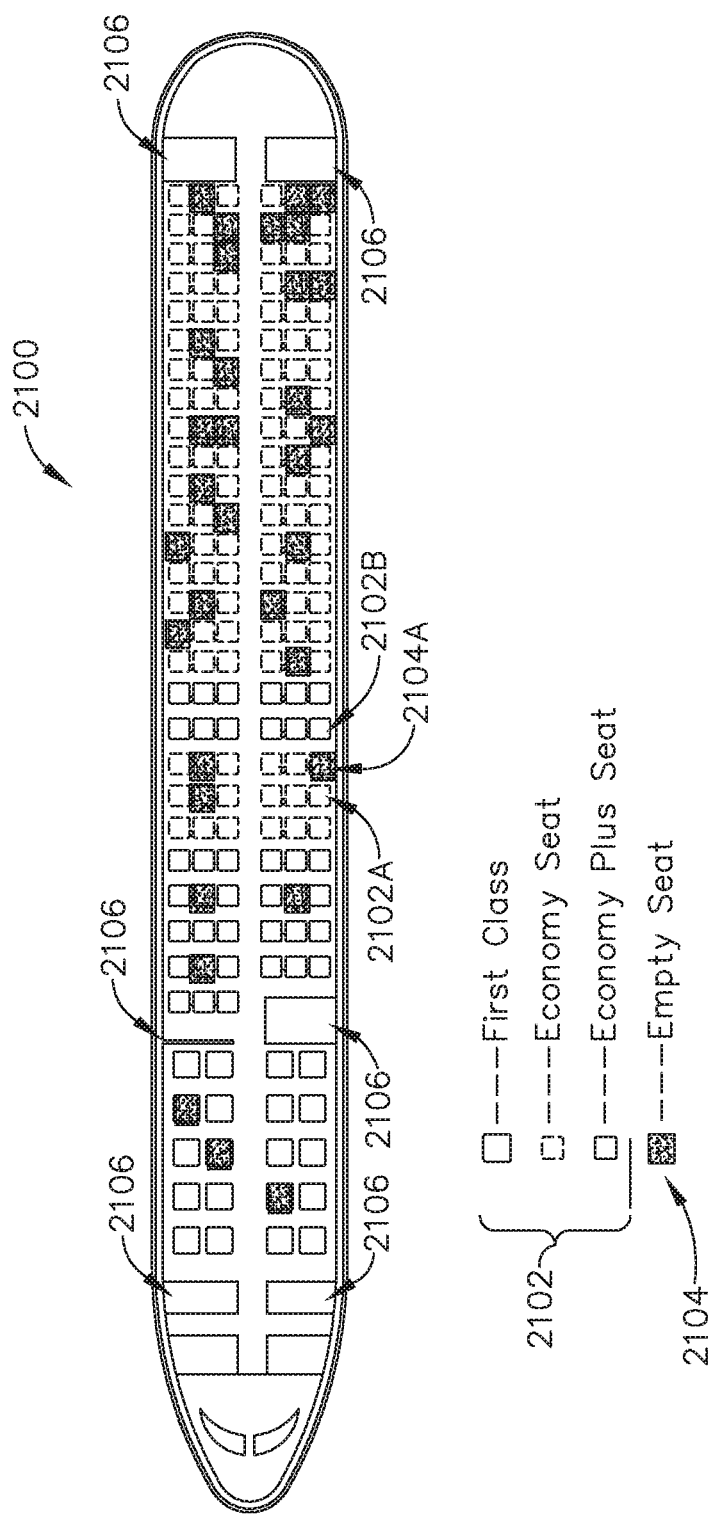
FIG. 21 is a top view of an exemplary organized seating arrangement.

FIG. 21 illustrates a top view of an exemplary organized seating arrangement 2100. Although the organized seating arrangement 2100 of illustrated in FIG. 21 shows seats within an aircraft, other types of seating arrangements are contemplated in further embodiments. The plurality of seats of the organized seating arrangement include occupied seat assemblies 2102 (including, in the illustrated embodiment, first class seats, economy seats, and economy plus seats), as well as a plurality of unoccupied seat assemblies 2104 (i.e., empty seats). As illustrated, the unoccupied seat assemblies 2104 are interspersed amongst the occupied seat assemblies 2102. Thus, occupants of the occupied seat assemblies 2104 located in front of (i.e., to the fore of the aircraft) or behind (i.e., to the aft of the aircraft) an unoccupied seat assembly 2104 may benefit from utilization of the space associated with such unoccupied seat assembly 2104 through use of the transformation functionality of the transformable seat assemblies disclosed above, as discussed further below.

As an example to further demonstrate the relation between the occupied seat assemblies 2102 and the unoccupied seat assemblies 2104 is further described. Unoccupied seat assembly 2104A is one of the unoccupied seat assemblies 2104. Each or both of two adjacent occupied seat assemblies 2102A and 2102B may be able to utilize a portion of unoccupied seat assembly 2104A. Where the occupied seat assembly 2102A is a transformable seat assembly 10 capable of extended reclining, occupied seat assembly 2102A may be transformed to a transformed configuration that enables use of a portion of the space associated with unoccupied seat assembly 2104A by the occupant of occupied seat assembly 2102A (as illustrated in FIGS. 1-3). Additionally or alternatively, where the unoccupied seat assembly 2104A is a transformable seat assembly 62, 76, 94, or 134, the unoccupied seat assembly 2104A may be transformed to a transformed configuration that enables use of a portion of the space associated with unoccupied seat assembly 2104A associated with unoccupied seat assembly 2104A by the occupant of occupied seat assembly 2102B (as illustrated in FIG. 6-8, 11-15, or 17-18).

In some embodiments, obstructions 2106 of impede or limit transformation of one or more seat assemblies of the organized seating arrangement 2100. Such obstructions 2106 may include bulkheads, lavatories, railings, aisles, walkways, or other space that is unavailable for use by an occupant of one of the seat assemblies. Based upon the positions of such obstructions 2106 relative to seat assemblies of the organized seating arrangement 2100, some seat assemblies may be nontransformable seat assemblies. Additionally or alternatively, some seat assemblies may likewise be partially transformable seat assemblies capable of limited transformation (e.g., only forward-related transformation or only aft-related transformation).

Although the embodiments described below refer to the organized seating arrangement 2100, it should be understood that the systems and methods may be implemented in any organized seating arrangement that includes transformable seat assemblies and unoccupied seat assemblies.

Figure 22:
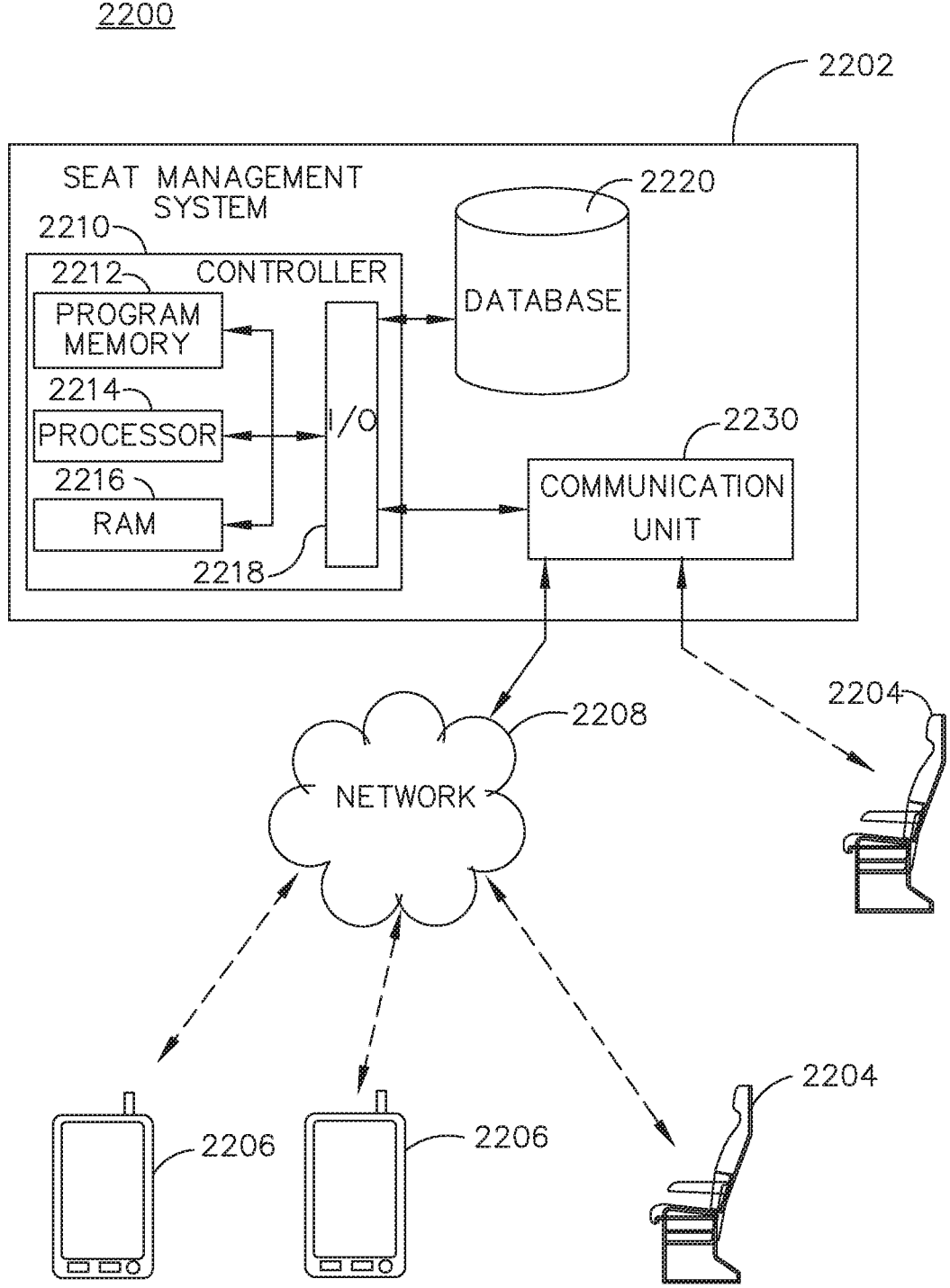
FIG. 22 is a block diagram of a seating arrangement system.

FIG. 22 illustrates an exemplary block diagram of a seating arrangement system 2200 for use in implementing part or all of the methods described herein. The seating arrangement system 2200 includes a seat management system 2202, which may be a general-purpose computer or a special-purpose computer. In some embodiments, the seat management system 2202 is installed within an aircraft or other vehicle or venue associated with the organized seating arrangement 2100. In further embodiments, the seat management system 2202 is located remotely from the organized seating arrangement 2100. The seat management system 2202 is communicatively linked to one or more computing devices 2206 associated with one or more users via a network 2208. In some embodiments, the seat management system 2202 is further communicatively linked to one or more transformable seat assemblies 2204, such as the transformable seat assemblies 10, 62, 76, 94, 134, and/or 142 described elsewhere herein.

The seat management system 2202 includes a controller 2210, a database 2220, and a communication unit 2230. The controller includes one or more of each of the following: a program memory 2212, a processor 2214, and a random access memory (RAM) 2216. Each program memory 2212 is a non-transitory, tangible memory device configured to store electronic data, such as instructions for implementing processes, routines, and software programs. Each processor 2214 is adapted and configured to execute computer-executable instructions, such as software programs, applications, and routines. Each RAM 2216 is configured as a volatile memory for storing electronic data while in use.

Each of the program memory 2212, processor 2214, and RAM 2216 is connected to an input/output (I/O) circuit 2218, which I/O circuit 2218 also connects the controller 2210 to the other components of the seat management system 2202 (i.e., the database 2220 and the communication unit 2230). The database 2220 is configured to store electronic data in a non-transitory, tangible memory device for use by software applications. In some embodiments, the database 2220 and the program memory 2212 may be combined into a single memory. The communication unit 2230 is a component of the seat management system 2202 configured to manage communication between the controller 2210 and external devices that are communicatively connected to the seat management system 2202, such as the transformable seat assemblies 2204 and computing devices 2206 via network communications.

The communication unit 2230 of the seat management system 2202 is configured to transmit and receive electronic communications, either directly or indirectly via the network 2208. In various embodiments, the network 2208 includes local or extended communication networks, which may include the Internet. The seat management system 2202 is configured to exchange electronic communication data with a plurality of computing devices 2206 (and, in some embodiments, with a plurality of transformable seat assemblies 2204) via the network 2208. In some embodiments, the communication unit 2230 is configured to directly send and/or receive electronic signals with transformable seat assemblies 2204. For example, the seat management system 2202 may be connected by direct wired or wireless connections to components of each of a plurality of transformable seat assemblies 2204 in an organized seating arrangement 2100, such as electrically actuated locking mechanisms or seat assembly controllers, to control transformation of such transformable seat assemblies 2204. In further embodiments, similar connections between the communication unit 2230 and components of the transformable seat assemblies 2204 may occur via the network 2208.

The computing devices 2206 are configured to send and/or receive electronic communication data via the network 2208. In various embodiments, one or more of the computing devices 2206 comprise user computing devices associated with occupants assigned to seat assemblies (e.g., mobile phones, notebook computers, desktop computers, or seatback display systems) and/or operator computing devices (e.g., computers installed at gates within an airport terminal, ticket office computers, or remote terminals communicatively connected to a server of an operator system). As discussed below, such computing devices 2206 may be used to communicate with occupants of seat assemblies and/or operator personnel regarding upgrades involving transformable seat assemblies 2204.

Additional or alternative embodiments of the seating arrangement system 2200 may include fewer, additional, or alternative components, as well as any combination of components illustrated in FIG. 22.

Figure 23:
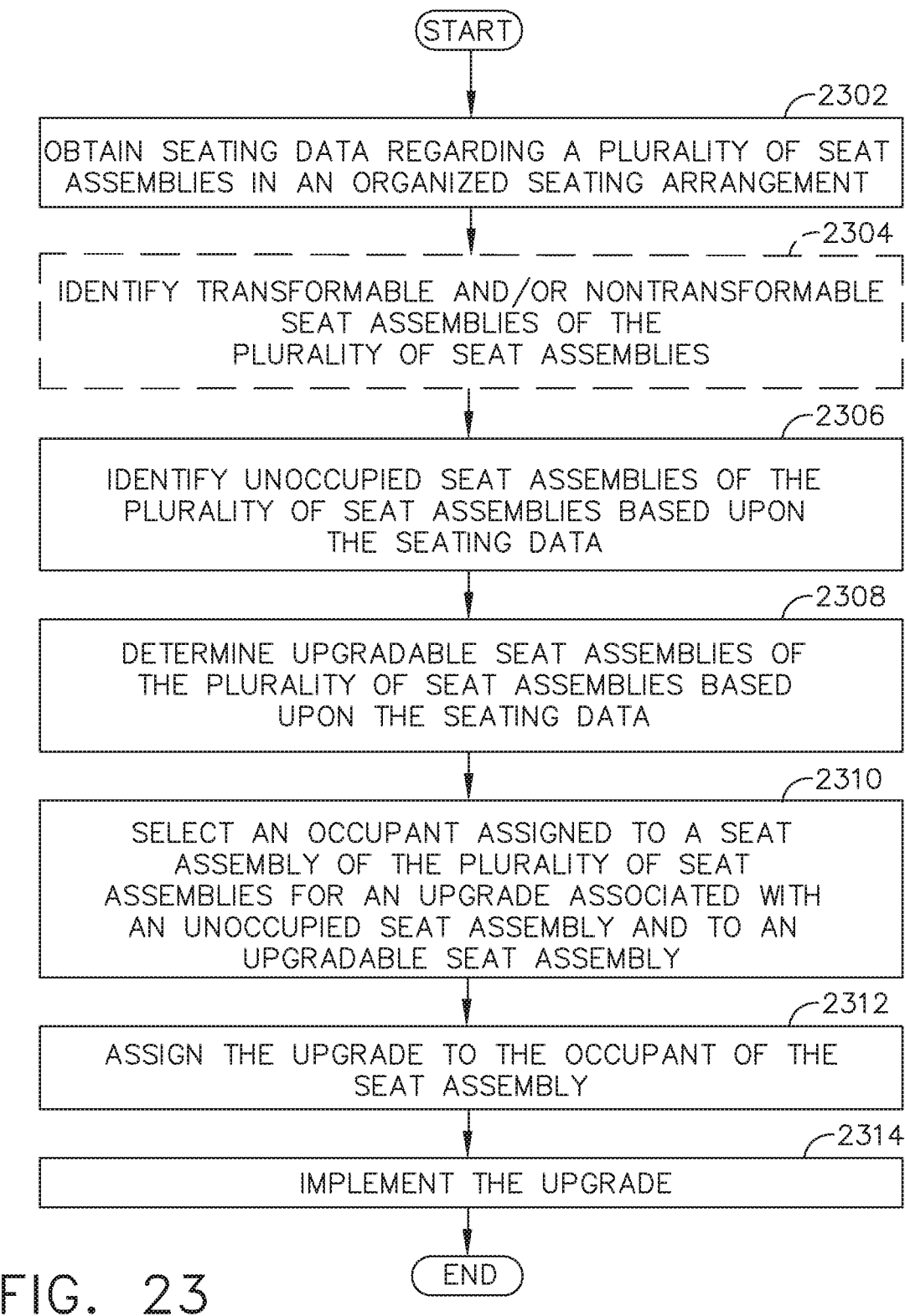
FIG. 23 is a flow diagram of an upgrade assignment method for identifying and allocating upgrades involving unoccupied seat assemblies and using transformable seat assemblies.

FIG. 23 illustrates an exemplary flow diagram of an upgrade assignment method 2300 for identifying and allocating upgrades involving unoccupied seat assemblies 2104 and using transformable seat assemblies 2204. The upgrade assignment method 2300 thus improves utilization of space associated with unoccupied seat assemblies 2104 in an organized seating arrangement that includes transformable seat assemblies 2204, such as the organized seating arrangement 2100. The seat management system 2202 implements the upgrade assignment method 2300 to assign one or more upgrades associated with one or more transformable seat assemblies and cause such upgrades to be implemented. In some embodiments, the processor 2214 of the seat management system 2202 implements computer-executable instructions to implement the upgrade assignment method 2300, which computer-executable instruction may be stored in the program memory 2212.

The upgrade assignment method 2300 begins by obtaining seating data regarding a plurality of seat assemblies of an organized seating arrangement 2100 (block 2302). In some embodiments, transformable and/or nontransformable seat assemblies in the organized seating arrangement 2100 are identified (block 2304). Based upon the seating data, unoccupied seat assemblies 2104 of the organized seating arrangement 2100 are identified (block 2306) and upgradable seat assemblies of the organized seating arrangement 2100 are identified (block 2308). An occupant assigned to a seat assembly of the organized seating arrangement 2100 is selected for an upgrade (block 2310), which upgrade is associated with both an unoccupied seat assembly 2104 and an upgradable seat assembly. The upgrade is then assigned to the occupant of the seat assembly (block 2312), which may in some embodiments require movement of the occupant to the upgradable seat assembly. The upgrade is then implemented (block 2314) to enable the occupant to utilize a portion of the space associated with the unoccupied seat associated with the upgrade.

At block 2302, the seat management system 2202 obtains seating data regarding a plurality of seat assemblies of the organized seating arrangement 2100. The plurality of seat assemblies includes one or more occupied seat assemblies 2102 and one or more unoccupied seat assemblies 2104. The plurality of seat assemblies further comprises one or more transformable seat assemblies 2204, each of which may be either an occupied seat assembly 2102 or an unoccupied seat assembly 2104. The seating data comprises arrangement data indicating positions of the seat assemblies in the organized seating arrangement and occupancy data indicating whether each seat assembly of the plurality of seat assemblies is occupied or unoccupied.

In some embodiments, each seat assembly of the organized seating arrangement 2100 is a transformable seat assembly 2204. In other embodiments, however, the plurality of seat assemblies of the organized seating arrangement 2100 further comprises one or more nontransformable seat assemblies, such a seat assemblies located adjacent to obstructions 2106. In such embodiments, the seating data further comprises capability data regarding transformation capabilities of each of the plurality of seat assemblies. Such capability data may indicate each seat assembly as being transformable or nontransformable, or the capability data may indicate a type or level of transformability for each seat.

At block 2304, in some embodiments, the seat management system 2202 identifies one or more transformable and/or nontransformable seat assemblies of the plurality of seat assemblies of the organized seating arrangement 2100. The transformable seat assemblies 2204 or the nontransformable seat assemblies are identified based upon the seating data, such as the capability data. In some such embodiments, transformation capabilities of each of the transformable seat assemblies 2204, such as reclining, folding, or seat-rotating capabilities, as discussed above with respect to various embodiments of the transformable seat assemblies 2204.

At block 2306, the seat management system 2202 identifies one or more unoccupied seat assemblies 2104 of the plurality of seat assemblies of the organized seating arrangement 2100 based upon the seating data. Identifying the unoccupied seat assemblies 2104 may include identifying indicators of unoccupied seat status for the unoccupied seat assemblies 2104 in the occupancy data of the seating data. Alternatively, identifying the unoccupied seat assemblies 2104 may include identifying seat assemblies for which no indicators of occupied seat status (e.g., ticket sales data) are found in the occupancy data of the seating data.

At block 2308, the seat management system 2202 identifies one or more upgradable seat assemblies of the plurality of seat assemblies of the organized seating arrangement 2100 based upon the seating data. Each upgradable seat assembly is located either directly behind or in front of an unoccupied seat assembly 2104. In some instances, an upgradable seat assembly may be located directly between two unoccupied seat assemblies 2104. Additionally, each of the one or more upgradable seat assemblies must be capable of providing additional space to the occupant of such upgradable seat assembly from an unoccupied seat assembly 2104. As described above, in various embodiments, the transformable seat assemblies 2204 enable use of such space from an unoccupied seat assembly 2104 by transformation of either the unoccupied seat assembly 2104 or an occupied seat assembly 2102. Thus, each of the one or more upgradable seat assemblies is one or both of the following: (i) located directly behind one of the seat assemblies that is both one of the unoccupied seat assemblies 2104 and one of the transformable seat assemblies 2204, or (ii) one of the transformable seat assemblies 2204 that is located directly in front of one of the unoccupied seat assemblies 2104. In some embodiments, the seat management system 2202 executes instructions stored in the program memory 2212 to implement logic that identifies the upgradable seat assemblies based upon such criteria regarding the occupancy status and transformation capabilities of the plurality of seat assemblies. Such identification may further include using the arrangement data to compare the relative positions within the organized seating arrangement 2100 of the identified unoccupied seat assemblies 2104 and the transformable seat assemblies 2204, using either assumed or variable transformation capabilities of the transformable seat assemblies 2204.

At block 2310, the seat management system 2202 selects an occupant assigned to a seat assembly of the plurality of seat assemblies of the organized seating arrangement 2100 for an upgrade. The upgrade is associated with one of the one or more unoccupied seat assemblies 2104 and is further associated with one of the one or more upgradable seat assemblies 2204. In some embodiments, the occupant is selected such that the seat assembly to which the selected occupant is assigned is an upgradable seat assembly associated with the upgrade, thereby avoiding the need for the occupant to move to another seat. In such embodiments, the occupant is identified for the upgrade at least in part by identifying the occupant of such upgradable seat assembly. In further embodiments, the occupant is selected from another seat assembly that is not an upgradable seat assembly associated with the upgrade, thereby expanding the group of occupants of the organized seating arrangement 2100 to whom the upgrade may be assigned. In such embodiments, the occupant selected for the upgrade will need to move to an upgradable seat assembly associated with the upgrade, so selecting the occupant for the upgrade includes determining a movement of the occupant from the seat assembly to which the occupant is assigned to an upgradable seat assembly associated with the upgrade.

Figure 24:
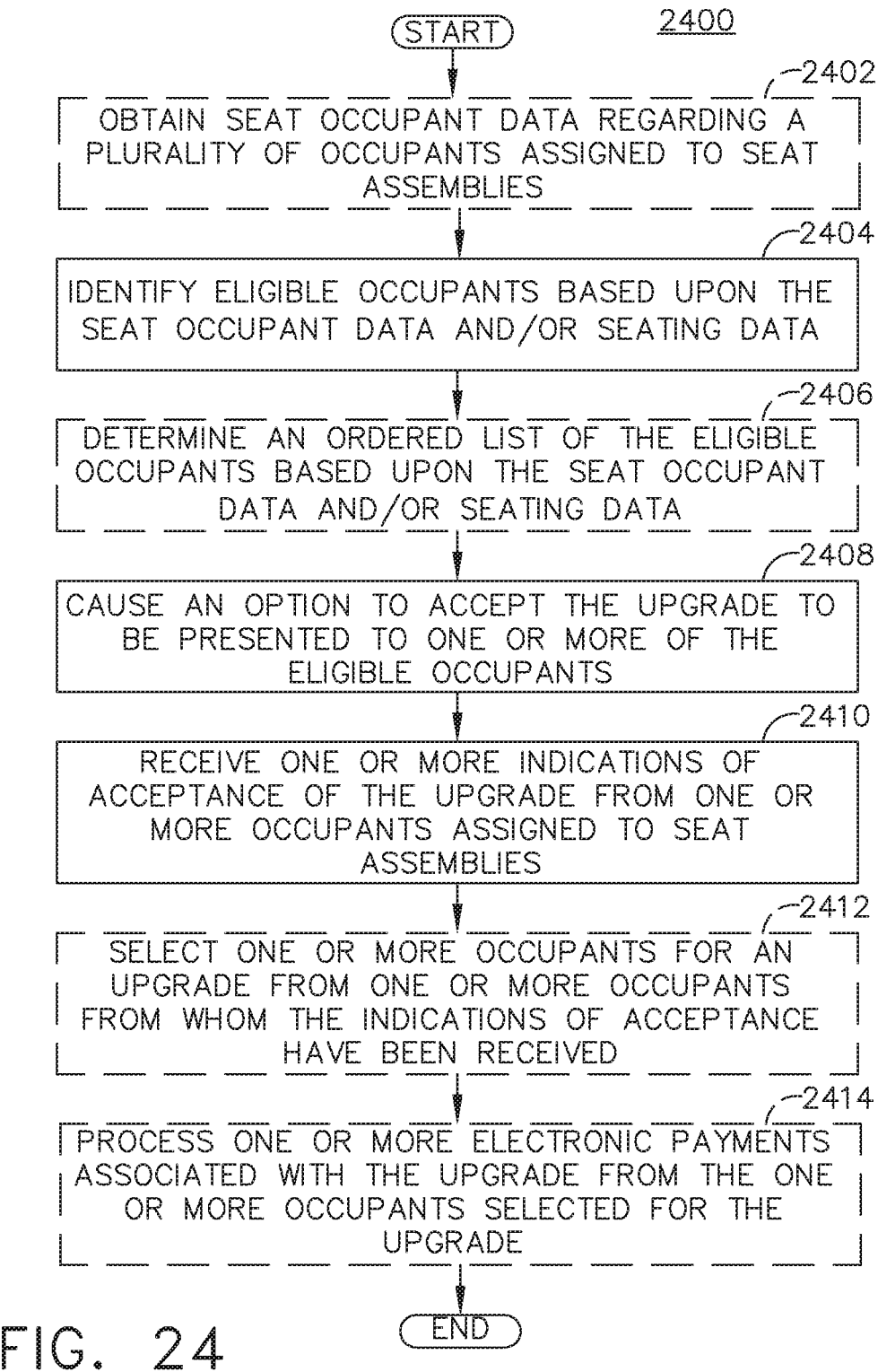
FIG. 24 is a flow diagram of an occupant selection method for selecting an occupant assigned to a seat assembly for an upgrade.

FIG. 24 illustrates an exemplary flow diagram of an occupant selection method 2400 for selecting an occupant assigned to a seat assembly for an upgrade involving unoccupied seat assemblies 2104 and using transformable seat assemblies 2204. The seat management system 2202 implements the occupant selection method 2400 to select the occupant for the upgrade at block 2310, in some embodiments of the upgrade assignment method 2300. Such occupant selection method 2400 allows occupant selection based upon occupant preferences or characteristics, thereby allowing yet more efficient use of available space associated with unoccupied seat assemblies 2104. In some embodiments, the processor 2214 of the seat management system 2202 implements computer-executable instructions to implement the occupant selection method 2400, which computer-executable instruction may be stored in the program memory 2212.

The occupant selection method 2400 begins, in some embodiments, by obtaining seat occupant data regarding a plurality of occupants assigned to seat assemblies of an organized seating arrangement 2100 (block 2402). Eligible occupants assigned to seat assemblies of the organized seating arrangement 2100 are then identified based upon the seat occupant data and/or seating data (block 2404). In some embodiments, an ordered list of the eligible occupants is further determined (block 2406), which may be used for offering upgrades to the eligible occupants. An option to accept the upgrade is then presented to one or more of the eligible occupants (block 2408), and indications of acceptance of the upgrade are received from one or more occupants to whom such options to accept the upgrade were presented (block 2410). In some embodiments, one or more of the occupants from the occupants indicating acceptance are then selected for an upgrade (block 2412), such as where more occupants indicate acceptance of upgrades than the number of available upgrades. In further embodiments, an electronic payment associated with an upgrade is processed from one or more occupants selected for upgrades (block 2414). After selection of an occupant of a seat assembly for an upgrade according to the occupant selection method 2400, the upgrade may be assigned and implemented, as discussed further below.

At block 2402, in some embodiments, the seat management system 2202 obtains seat occupant data regarding a plurality of occupants assigned to seat assemblies of the organized seating arrangement 2100. The seat occupant data is differentiated from the seating data in that the seat occupant data is associated with persons assigned to or occupying seat assemblies, rather than being associated with the seat assemblies. In some such embodiments, the seat occupant data includes one or both of: (i) seating preferences of the plurality of occupants and/or (ii) a status level of each of the plurality of occupants. In further embodiments, the seating preferences of each of the plurality of occupants includes an indication by such occupant of acceptance or rejection of a contingent offer of an upgrade and associated with a price. Such seating preferences may include, for example, a bid of a maximum price the occupant would be willing to pay (e.g., in currency or reward program units) to obtain an upgrade, which may be further dependent upon a type of the upgrade. In yet further embodiments, the seating preferences of each of the plurality of occupants may include preferences regarding moving from an assigned seat assembly to another seat assembly for the upgrade. In still further embodiments, the seating preferences of each of the plurality of occupants may include preferences regarding a location or type of seat assembly within the organized seating arrangement 2100 (e.g., an aisle seat, window seat, or middle seat within an aircraft).

At block 2404, the seat management system 2202 identifies a plurality of eligible occupants from the plurality of occupants assigned to seat assemblies of the organized seating arrangement 2100 based upon the seat occupant data and/or the seating data. In some embodiments, seating data is used to identify the eligible occupants based upon locations of their assigned seat assemblies relative to unoccupied seat assemblies 2104, such as by identifying the eligible occupants as occupants of upgradable seat assemblies. In further embodiments, seat occupant data is used to identify the eligible occupants based upon occupant preferences or status. For example, the eligible occupants may be identified as those occupants previously indicating preferences for an upgrade or having a frequent-customer status. In yet further embodiments, both seating data and seat occupant data are used to identify the eligible occupants, such as by identifying occupants of upgradable seat assemblies who indicated preferences for an upgrade.

At block 2406, in some embodiments, the seat management system 2202 determines an ordered list of the eligible occupants based upon the seat occupant data and/or seating data. Because the number of eligible occupants will frequently exceed the number of available upgrades, the ordered list indicates an order in which the eligible occupants will be offered available upgrades or in which the eligible occupants will be selected for available upgrades. In some such embodiments, the ordered list is determined based upon one or more of the following: (i) whether the eligible occupant is currently assigned to an upgradeable seat assembly, (ii) occupant status level, or (iii) occupant price preferences. In further embodiments, the ordered list groups the eligible occupants into groups of equal priority for simplicity.

At block 2408, the seat management system 2202 causes an option to accept the upgrade to be presented to one or more of the eligible occupants. In some embodiments, causing the option to accept the upgrade to be presented to an eligible occupant includes sending electronic data regarding the option to accept the upgrade to a computing device 2206 associated with the eligible occupant via the network 2208. For example, a notification may be sent to the eligible occupant as an e-mail, SMS text message, push notification, or notification within an application running on the computing device 2206 associated with the eligible occupant. Such option to accept the upgrade may be presented to the eligible occupant prior to arriving at the organized seating arrangement 2100, prior to seating, or during seating. In further such embodiments, the computing device 2206 may be disposed at the seat assembly of the eligible occupant, such that the option to accept the upgrade is presented to the occupant after seating. In some embodiments, the option to accept the upgrade is associated with a price or other cost associated with the upgrade, and presenting the option to accept the upgrade include presenting an indication of the price or other cost.

In embodiments in which an ordered list of the eligible occupants has been determined, options to accept the upgrade are presented to one or more eligible occupants based upon the order of the eligible occupants in the ordered list. In further embodiments, causing the option to accept the upgrade to be presented to an eligible occupant may include providing information to operator personnel via a computing device 2206 instructing the operator personnel may offer the upgrade to the eligible occupant. In various embodiments, one or more options to accept the upgrade are offered to one or more eligible occupants, either simultaneously or in a sequence.

At block 2410, the seat management system 2202 receives one or more indications of acceptance of the upgrade from one or more occupants to whom options to accept the upgrade were presented. In some embodiments, one or more options to accept the upgrade are offered to one or more eligible occupants until one of the eligible occupants accepts the upgrade, at which point the accepting eligible occupant is selected for the upgrade. In further embodiments, the one or more options to accept the upgrade are offered to one or more eligible occupants without regard to indications of acceptance of the upgrade received from other eligible occupants, in which case further selection of one or more occupants for the upgrade from among a plurality of occupants from whom indications of acceptance are received is necessary when the number of indications of acceptance exceeds the number of available upgrades. In some embodiments, the indication of acceptance of the upgrade includes a selection from among a plurality of available upgrades, such as types of upgrades or available seating reassignments. In further embodiments, the indication of acceptance of the upgrade includes price information regarding a payment amount associated with the upgrade, which may include a bid of the occupant for the upgrade.

At block 2412, in some embodiments, the seat management system 2202 selects one or more occupants for an upgrade from among the one or more occupants from whom indications of acceptance of the upgrade have been received. When all the one or more occupants from whom indications of acceptance of the upgrade have been received can receive upgrades, each such occupant is selected. When the available upgrades are insufficient, however, one or more occupants are selected for the upgrade. In some such embodiments, the one or more occupants are selected for the upgrade based upon one or more of the following: (i) whether the occupant is currently assigned to an upgradeable seat assembly associated with the upgrade, (ii) occupant status level, (iii) occupant price preferences or bid, (iv) time at which the indication of acceptance of the upgrade was received from the occupant. In embodiments in which an ordered list of the eligible occupants is used, the one or more occupants are selected for the upgrade based upon the order of the ordered list. Such selection may include selecting a limited number of occupants for upgrades from among the one or more occupants from whom indications of acceptance of the upgrade have been received based upon the ordered list. Alternatively, such selection may include presenting an option to accept an upgrade to a limited number of eligible occupants until all available upgrades have been accepted.

At block 2414, in some embodiments, the seat management system 2202 processes one or more payments associated with the upgrade from the one or more occupants selected for the upgrade. In some embodiments, the payments are processed as electronic payments, such as credit card payments, electronic account payments, or electronic currency transfers. In further embodiments, the payments include use of reward program units, such as points or miles associated with the occupants. In various embodiments, payments are received directly from the one or more occupants interacting with a payment interface or are received indirectly through operator personnel recording payments received from the one or more occupants. While payment may be received prior to assignment of the upgrade in some embodiments, a charge may be billed after assignment of the upgrade in other embodiments.

Returning to FIG. 23, at block 2312, the seat management system 2202 assigns the upgrade to the occupant assigned to the seat assembly who has been selected for the upgrade. In embodiments in which more than one occupant is selected for an upgrade, the respective upgrade is assigned to each such selected occupant. The upgrade enables the occupant to whom it is assigned to use a portion of space associated with an unoccupied seat assembly 2104 associated with the upgrade while occupying an upgradable seat assembly associated with the upgrade. In some embodiments, assigning the upgrade to an occupant includes reassigning the occupant from the seat assembly to which the occupant was assigned to an upgradable seat assembly associated with the upgrade. In some such embodiments, reassigning the occupant to the upgradable seat assembly further includes reassigning one or more additional occupants of seat assemblies of the organized seating arrangement 2100 to enable such reassignment of the occupant. In further embodiments, assigning the upgrade to the occupant includes causing a notification of the upgrade to be presented to the occupant of the seat assembly, such as by communication of the notification to a computing device 2206 associated with the occupant or providing information regarding the upgrade to operator personnel for further notification of the occupant.

At block 2314, the upgrade is implemented to enable the occupant to use a portion of space associated with the unoccupied seat assembly 2104 associated with the upgrade. In some embodiments, implementing the upgrade includes the seat management system 2202 sending instructions to a computing device 2206 associated with operator personnel, which instructions direct the operator personnel to facilitate the upgrade. In some such embodiments, facilitating the upgrade includes unlocking a locking mechanism of a transformable seat assembly 2204, such as blocking members 24 or 24' disclosed above. Unlocking the locking mechanism enables the transformable seat assembly 2204 to be transformed to a transformed configuration for comfort of the occupant of the upgradable seat assembly, which may both be the same seat assembly in some embodiments. Operator personnel may use keys or specialized tools to unlock such locking mechanisms. In alternative embodiments, the seat management system 2202 actuates (directly or through communication with an electronic component of a transformable seat assembly 2204) such locking mechanisms. In further embodiments, implementing the upgrade includes transforming the transformable seat assembly 2204 to a transformed configuration.

Figure 25:
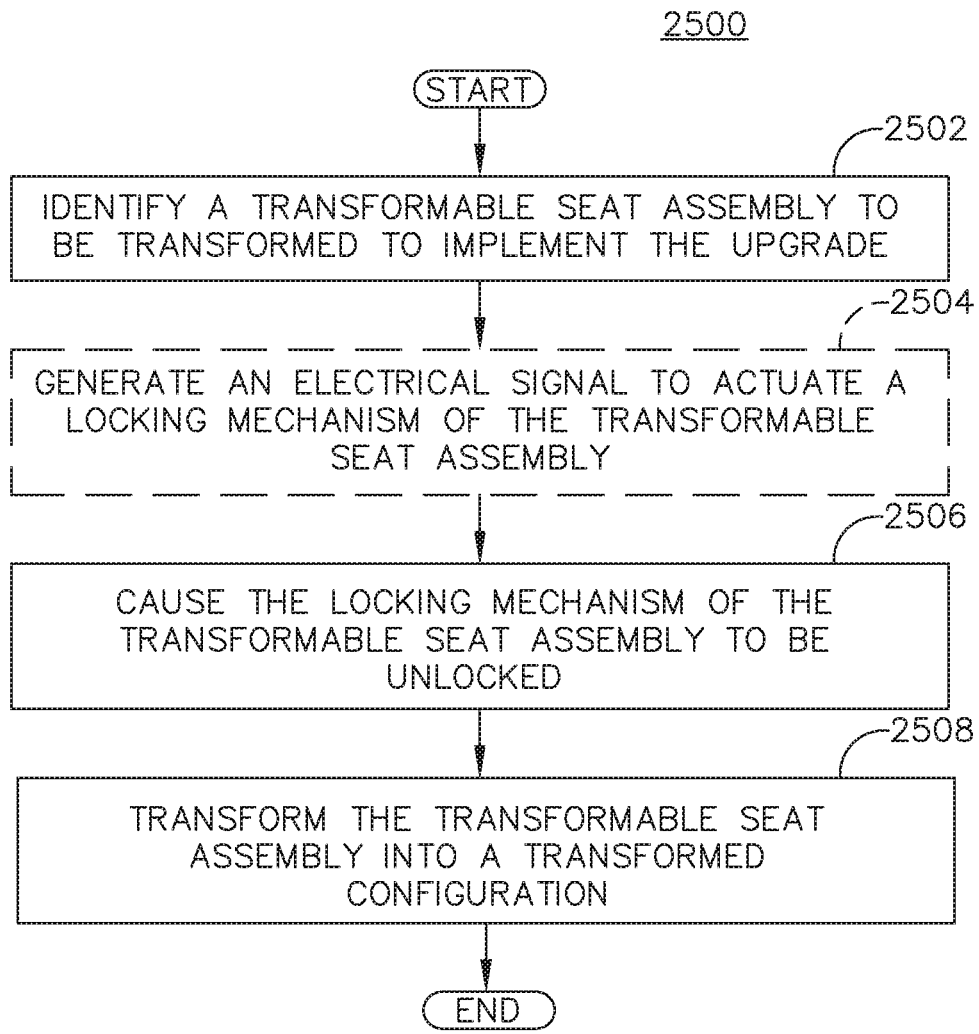
FIG. 25 is a flow diagram of an upgrade implementation method for implementing the upgrade.

FIG. 25 illustrates an exemplary flow diagram of an upgrade implementation method 2500 for implementing the upgrade by unlocking a locking mechanism of a transformable seat assembly 2204. The seat management system 2202 implements part or all of the upgrade implementation method 2500 to cause the upgrade to be implemented at block 2314, in some embodiments of the upgrade assignment method 2300. In some embodiments, the processor 2214 of the seat management system 2202 implements computer-executable instructions to implement the upgrade implementation method 2500, which computer-executable instruction may be stored in the program memory 2212. In further embodiments, implementing the upgrade implementation method 2500 includes actuating components of one or more transformable seat assemblies 2204.

The upgrade implementation method 2500 begins by identifying a transformable seat assembly 2204 to be transformed to implement the upgrade (block 2502). In some embodiments, an electrical signal is generated to actuate a locking mechanism of the transformable seat assembly 2204 (block 2504). The locking mechanism of the transformable seat assembly 2204 is then unlocked (block 2506), which may include sending the electrical signal to an actuator of the transformable seat assembly 2204 in some embodiments. The transformable seat assembly 2204 is then transformed into a transformed configuration (block 2508).

At block 2502, the seat management system 2202 identifies a transformable seat assembly 2204 associated with the upgrade to be transformed in order to implement the upgrade. The transformable seat assembly 2204 to be transformed is either (i) the upgradeable seat assembly located directly in front of an unoccupied seat assembly 2104 or (ii) an unoccupied seat assembly 2104 directly in front of the upgradable seat assembly associated with the upgrade. In some embodiment, the transformable seat assembly 2204 is identified based upon the identity of the upgradable seat assembly associated with the upgrade and a type of upgrade or transformation assigned to the occupant to whom the upgrade is assigned. For example, the transformable seat assembly 2204 to be transformed may be identified as the upgradable seat for reclining upgrades, while the transformable seat assembly 2204 to be transformed may be identified as the unoccupied seat assembly 2104 directly in front of the upgradable seat assembly for other types of upgrades.

At block 2504, in some embodiments, the seat management system 2202 generates an electrical signal to send to a component of the transformable seat assembly 2204 in order to actuate a locking mechanism of the transformable seat assembly 2204. In such embodiments, the seat management system 2202 is configured to control the locking mechanism, which is an electrically actuated locking mechanism. In some such embodiments, the electrical signal is a control signal for a motor 54 that operates an actuator assembly 18 or 18', as described above. In further embodiments, the electrical signal is an electronic communication signal including data that causes a control component of the transformable seat assembly 2204 to actuate the electrically actuated locking mechanism.

At block 2506, the seat management system 2202 causes the locking mechanism of the transformable seat assembly 2204 to be unlocked in order to implement the upgrade. In some embodiments, causing the locking mechanism to be unlocked includes sending instructions for unlocking the locking mechanism to a computing device 2206 associated with either the occupant or with operator personnel, who may then manually unlock the locking mechanism. In further embodiments, causing the locking mechanism to be unlocked includes sending the electrical signal from the communication unit 2230 to a component of the transformable seat assembly 2204. In some such embodiments, the electrical signal is an electronic communication signal and is transmitted via the network 2208 to a control component of the transformable seat assembly. Upon receiving such electronic communication signal, the control component electrically actuates the electrically actuated locking mechanism to unlock the locking mechanism.

At block 2508, the transformable seat assembly 2204 is transformed into a transformed configuration in order to implement the upgrade. In some embodiments, transformable seat assembly 2204 is transformed into a transformed configuration includes sending instructions from the seat management system 2202 to a computing device associated with the occupant or operator personnel to reconfigure the transformable seat assembly 2204. In further embodiments, the seat management system 2202 controls one or more electrical components (e.g., motors or solenoids) to transform the transformable seat assembly 2204, such as by releasing a pin or latch in order to enable a spring to reposition a portion of the transformable seat assembly 2204.

Transforming the transformable seat assembly 2204 into a transformed configuration enables the occupant to whom the upgrade was assigned to use a portion of the space associated with the unoccupied seat assembly 2104 associated with the upgrade. As an example, the transformable seat assembly 2204 may be an unoccupied seat assembly 2104 associated with the upgrade, such as the transformable seat assembly 94 illustrated and discussed above with respect to FIGS. 13-16, and the upgradable seat assembly may be the seat assembly 96 located directly behind such transformable seat assembly 94. When transformed to a transformed configuration by rotating a seat 98 of the transformable seat assembly 94 forward (i.e., away from the seat assembly 96), a space is provided for the legs of the occupant of the seat assembly 96.

Upon implementation of the upgrade, the upgrade assignment method 2300 terminates. The selected occupant may then enjoy the use of the additional space from the unoccupied seat assembly 2104. Any transformable seat assemblies 2204 may be returned to an initial configuration upon completion of use by the selected occupant (e.g., at the conclusion of a flight, show, or performance).

While various embodiments have been described above, this disclosure is not intended to be limited thereto. Variations can be made to the disclosed embodiments that are still within the scope of the appended claims.

What is claimed:

1. A computer-implemented method for facilitating use of transformable seat assemblies, comprising:
   receiving, at one or more processors, seating data regarding a plurality of seat assemblies arranged in an organized seating arrangement, wherein the plurality of seat assemblies comprises one or more transformable seat assemblies, and wherein the seating data comprises (i) arrangement data indicating positions of the plurality of seat assemblies in the organized seating arrangement and (ii) occupancy data indicating whether each seat assembly of the plurality of seat assemblies is occupied or unoccupied;
   identifying, by the one or more processors, one or more unoccupied seat assemblies of the plurality of seat assemblies based upon the seating data;
   determining, by the one or more processors, one or more upgradable seat assemblies of the plurality of seat assemblies, wherein each of the one or more upgradable seat assemblies is one or both of the following: (i) located directly behind one of the seat assemblies that is both one of the unoccupied seat assemblies and one of the transformable seat assemblies, or (ii) one of the transformable seat assemblies that is located directly in front of one of the unoccupied seat assemblies;
   selecting, by the one or more processors, an occupant assigned to a seat assembly of the plurality of seat assemblies for an upgrade, wherein the upgrade is associated with one of the one or more unoccupied seat assemblies and is further associated with one of the one or more upgradable seat assemblies; and
   assigning, by the one or more processors, the upgrade to the occupant, wherein the upgrade enables the occupant to use a portion of space associated with the one of the one or more unoccupied seat assemblies associated with the upgrade while occupying the one of the one or more upgradable seat assemblies associated with the upgrade by reconfiguring a transformable seat assembly of the one or more transformable seat assemblies to a transformed configuration.

2. The computer-implemented method of claim 1, wherein: (i) the plurality of seat assemblies further comprises one or more nontransformable seat assemblies and (ii) the seating data further comprises capability data regarding transformation capabilities of each of the plurality of seat assemblies, and further comprising:
   identifying, by the one or more processors, the one or more transformable seat assemblies of the plurality of seat assemblies based upon the seating data.

3. The computer-implemented method of claim 1, wherein:
   the seat assembly is the one of the one or more upgradable seat assemblies associated with the upgrade; and
   selecting the occupant for the upgrade includes identifying the occupant.

4. The computer-implemented method of claim 1, wherein:
   the seat assembly is not the one of the one or more upgradable seat assemblies associated with the upgrade; and
   selecting the occupant for the upgrade includes determining a movement of the occupant from the seat assembly to the one of the one or more upgradable seat assemblies associated with the upgrade.

5. The computer-implemented method of claim 1, wherein selecting the occupant for the upgrade includes:
   receiving seat occupant data regarding a plurality of occupants assigned to seat assemblies of the plurality of seat assemblies;
   identifying a plurality of eligible occupants from the plurality of occupants based upon the seat occupant data;
   determining an ordered list of the plurality of eligible occupants based upon the seat occupant data;
   until one of the plurality of eligible occupants accepts the upgrade, causing an option to accept the upgrade to be presented to one or more of the eligible occupants based upon the ordered list; and
   selecting the one of the plurality of eligible occupants who accepts the upgrade as the occupant for the upgrade.

6. The computer-implemented method of claim 5, wherein the seat occupant data includes one or both of: (i) seating preferences of the plurality of occupants, the seating preferences including an indication by each of the plurality of occupants of acceptance or rejection of a contingent offer of the upgrade and associated with a price, or (ii) a status level of each of the plurality of occupants.

7. The computer-implemented method of claim 1, wherein selecting the occupant for the upgrade includes:
   causing an option to accept the upgrade to be presented to the occupant, wherein the option includes a price associated with the upgrade;
   receiving an indication of acceptance of the upgrade by the occupant; and
   processing an electronic payment by the occupant.

8. The computer-implemented method of claim 1, further comprising:
   causing, by the one or more processors, the upgrade to be implemented by unlocking a locking mechanism of the transformable seat assembly of the one or more transformable seat assemblies, wherein the transformable seat assembly is one of the following: (i) the one of the one or more unoccupied seat assemblies associated with the upgrade or (ii) the one of the one or more upgradable seat assemblies associated with the upgrade, and wherein unlocking the locking mechanism enables the transformable seat assembly to be transformed to a transformed configuration for comfort of the occupant.

9. The computer-implemented method of claim 8, wherein:
the locking mechanism is an electrically actuated locking mechanism; and
causing the upgrade to be implemented by unlocking the locking mechanism includes generating an electrical signal that electrically actuates the locking mechanism.

10. The computer-implemented method of claim 8, wherein:
the transformable seat assembly is the one of the one or more unoccupied seat assemblies associated with the upgrade;
the one of the one or more upgradable seat assemblies associated with the upgrade is located directly behind the transformable seat assembly; and
the transformed configuration of the transformable seat assembly includes a space provided by rotating a seat of the transformable seat assembly forward.

11. A computer system for facilitating use of transformable seat assemblies, comprising:
one or more processors;
a program memory communicatively connected to the one or more processors and storing executable instructions that, when executed by the one or more processors, cause the computer system to:
receive seating data regarding a plurality of seat assemblies arranged in an organized seating arrangement, wherein the plurality of seat assemblies comprises one or more transformable seat assemblies, and wherein the seating data comprises (i) arrangement data indicating positions of the plurality of seat assemblies in the organized seating arrangement and (ii) occupancy data indicating whether each seat assembly of the plurality of seat assemblies is occupied or unoccupied;
identify one or more unoccupied seat assemblies of the plurality of seat assemblies based upon the seating data;
determine one or more upgradable seat assemblies of the plurality of seat assemblies, wherein each of the one or more upgradable seat assemblies is one or both of the following: (i) located directly behind one of the seat assemblies that is both one of the unoccupied seat assemblies and one of the transformable seat assemblies, or (ii) one of the transformable seat assemblies that is located directly in front of one of the unoccupied seat assemblies;
select an occupant assigned to a seat assembly of the plurality of seat assemblies for an upgrade, wherein the upgrade is associated with one of the one or more unoccupied seat assemblies and is further associated with one of the one or more upgradable seat assemblies; and
assign the upgrade to the occupant, wherein the upgrade enables the occupant to use a portion of space associated with the one of the one or more unoccupied seat assemblies associated with the upgrade while occupying the one of the one or more upgradable seat assemblies associated with the upgrade bar reconfiguring a transformable seat assembly of the one or more transformable seat assemblies to a transformed configuration.

12. The computer system of claim 11, wherein the executable instructions that cause the computer system to select the occupant for the upgrade further cause the computer system to:
receive seat occupant data regarding a plurality of occupants assigned to seat assemblies of the plurality of seat assemblies, wherein the seat occupant data includes one or both of: (i) seating preferences of the plurality of occupants, the seating preferences including an indication by each of the plurality of occupants of acceptance or rejection of a contingent offer of the upgrade and associated with a price, or (ii) a status level of each of the plurality of occupants;
identify a plurality of eligible occupants from the plurality of occupants based upon the seat occupant data;
determine an ordered list of the plurality of eligible occupants based upon the seat occupant data;
until one of the plurality of eligible occupants accepts the upgrade, cause an option to accept the upgrade to be presented to one or more of the eligible occupants based upon the ordered list; and
select the one of the plurality of eligible occupants who accepts the upgrade as the occupant for the upgrade.

13. The computer system of claim 11, wherein the executable instructions that cause the computer system to select the occupant for the upgrade further cause the computer system to:
cause an option to accept the upgrade to be presented to the occupant, wherein the option includes a price associated with the upgrade;
receive an indication of acceptance of the upgrade by the occupant; and
process an electronic payment by the occupant.

14. The computer system of claim 11, wherein the executable instructions further cause the computer system to:
cause the upgrade to be implemented by unlocking a locking mechanism of a transformable seat assembly of the one or more transformable seat assemblies, wherein the transformable seat assembly is one of the following: (i) the one of the one or more unoccupied seat assemblies associated with the upgrade or (ii) the one of the one or more upgradable seat assemblies associated with the upgrade, and wherein unlocking the locking mechanism enables the transformable seat assembly to be transformed to a transformed configuration for comfort of the occupant.

15. The computer system of claim 14, wherein:
the locking mechanism is an electrically actuated locking mechanism; and
the executable instructions that cause the upgrade to be implemented by unlocking the locking mechanism include executable instructions that generate an electrical signal that electrically actuates the locking mechanism.

16. A tangible, non-transitory computer-readable medium storing executable instructions for facilitating use of transformable seat assemblies that, when executed by one or more processors of a computer system, cause the computer system to:
receive seating data regarding a plurality of seat assemblies arranged in an organized seating arrangement, wherein the plurality of seat assemblies comprises one or more transformable seat assemblies, and wherein the seating data comprises (i) arrangement data indicating positions of the plurality of seat assemblies in the organized seating arrangement and (ii) occupancy data indicating whether each seat assembly of the plurality of seat assemblies is occupied or unoccupied;

identify one or more unoccupied seat assemblies of the plurality of seat assemblies based upon the seating data;

determine one or more upgradable seat assemblies of the plurality of seat assemblies, wherein each of the one or more upgradable seat assemblies is one or both of the following: (i) located directly behind one of the seat assemblies that is both one of the unoccupied seat assemblies and one of the transformable seat assemblies, or (ii) one of the transformable seat assemblies that is located directly in front of one of the unoccupied seat assemblies;

select an occupant assigned to a seat assembly of the plurality of seat assemblies for an upgrade, wherein the upgrade is associated with one of the one or more unoccupied seat assemblies and is further associated with one of the one or more upgradable seat assemblies; and assign the upgrade to the occupant, wherein the upgrade enables the occupant to use a portion of space associated with the one of the one or more unoccupied seat assemblies associated with the upgrade while occupying the one of the one or more upgradable seat assemblies associated with the upgrade by reconfiguring a transformable seat assembly of the one or more transformable seat assemblies to a transformed configuration.

17. The tangible, non-transitory computer-readable medium of claim 16, wherein the executable instructions that cause the computer system to select the occupant for the upgrade further cause the computer system to:

receive seat occupant data regarding a plurality of occupants assigned to seat assemblies of the plurality of seat assemblies, wherein the seat occupant data includes one or both of: (i) seating preferences of the plurality of occupants, the seating preferences including an indication by each of the plurality of occupants of acceptance or rejection of a contingent offer of the upgrade and associated with a price, or (ii) a status level of each of the plurality of occupants;

identify a plurality of eligible occupants from the plurality of occupants based upon the seat occupant data;

determine an ordered list of the plurality of eligible occupants based upon the seat occupant data;

until one of the plurality of eligible occupants accepts the upgrade, cause an option to accept the upgrade to be presented to one or more of the eligible occupants based upon the ordered list; and select the one of the plurality of eligible occupants who accepts the upgrade as the occupant.

18. The tangible, non-transitory computer-readable medium of claim 16, wherein the executable instructions that cause the computer system to select the occupant for the upgrade further cause the computer system to:

cause an option to accept the upgrade to be presented to the occupant, wherein the option includes a price associated with the upgrade;

receive an indication of acceptance of the upgrade by the occupant; and process an electronic payment by the occupant.

19. The tangible, non-transitory computer-readable medium of claim 16, wherein the executable instructions further cause the computer system to:

cause the upgrade to be implemented by unlocking a locking mechanism of a transformable seat assembly of the one or more transformable seat assemblies, wherein the transformable seat assembly is one of the following: (i) the one of the one or more unoccupied seat assemblies associated with the upgrade or (ii) the one of the one or more upgradable seat assemblies associated with the upgrade, and wherein unlocking the locking mechanism enables the transformable seat assembly to be transformed to a transformed configuration for comfort of the occupant.

20. The tangible, non-transitory computer-readable medium of claim 19, wherein:

the locking mechanism is an electrically actuated locking mechanism; and the executable instructions that cause the upgrade to be implemented by unlocking the locking mechanism include executable instructions that generate an electrical signal that electrically actuates the locking mechanism.

* * * * *

UNITED STATES PATENT AND TRADEMARK OFFICE
CERTIFICATE OF CORRECTION

PATENT NO. : 10,934,001 B2
APPLICATION NO. : 16/223955
DATED : March 2, 2021
INVENTOR(S) : Haftom Y. Dessalegn et al.

Page 1 of 1

It is certified that error appears in the above-identified patent and that said Letters Patent is hereby corrected as shown below:

In the Claims

At Column 29, Line 65, "bar" should be -- by --.

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*